(12) United States Patent
Takayama et al.

(10) Patent No.: US 7,835,102 B2
(45) Date of Patent: Nov. 16, 2010

(54) HEAT ASSISTED MAGNETIC RECORDING HEAD COMPRISING PLASMON ANTENNA WITH FLAT SURFACES OPPOSED TO MEDIUM

(75) Inventors: Seiichi Takayama, Tokyo (JP); Eiji Komura, Tokyo (JP); Kosuke Tanaka, Tokyo (JP); Daisuke Miyauchi, Tokyo (JP); Koji Shimazawa, Tokyo (JP)

(73) Assignee: TDK Corporation, Tokyo (JP)

( * ) Notice: Subject to any disclaimer, the term of this patent is extended or adjusted under 35 U.S.C. 154(b) by 137 days.

(21) Appl. No.: 12/239,141

(22) Filed: Sep. 26, 2008

(65) Prior Publication Data

US 2010/0079895 A1 Apr. 1, 2010

(51) Int. Cl.
*G11B 5/02* (2006.01)

(52) U.S. Cl. .............. 360/59; 369/13.33; 369/13.13

(58) Field of Classification Search .......... 360/59; 369/13.13, 13.33, 13.17, 13.32, 112.09, 112.14, 369/112.21, 112.27; 385/129, 31, 88–94; 250/201.3, 201.5, 311, 310; 850/30, 32
See application file for complete search history.

(56) References Cited

U.S. PATENT DOCUMENTS

| | | | | |
|---|---|---|---|---|
| 5,272,330 A | * | 12/1993 | Betzig et al. | 250/216 |
| 5,696,372 A | * | 12/1997 | Grober et al. | 250/216 |
| 6,649,894 B2 | | 11/2003 | Matsumoto et al. | |
| 6,768,556 B1 | | 7/2004 | Matsumoto et al. | |
| 6,795,380 B2 | * | 9/2004 | Akiyama et al. | 369/13.33 |
| 6,949,732 B2 | * | 9/2005 | Kiguchi et al. | 250/216 |
| 7,054,234 B2 | * | 5/2006 | Saga et al. | 369/13.33 |
| 7,529,158 B2 | * | 5/2009 | Matsumoto et al. | 369/13.33 |
| 7,652,775 B2 | * | 1/2010 | Matsumoto | 356/507 |
| 2004/0085862 A1 | | 5/2004 | Matsumoto et al. | |
| 2005/0047283 A1 | * | 3/2005 | Ruigrok | 369/13.33 |
| 2010/0073802 A1 | * | 3/2010 | Komura et al. | 360/59 |

FOREIGN PATENT DOCUMENTS

JP 2008-059691 3/2008

* cited by examiner

*Primary Examiner*—Tan X Dinh
(74) *Attorney, Agent, or Firm*—Frommer Lawrence & Haug LLP

(57) ABSTRACT

Provided is a plasmon antenna in which a near-field light having a sufficient intensity is generated only in a desired location. The plasmon antenna comprises an end surface on a side where a near-field light is generated; the end surface is flat and has a shape with at least three vertexes or rounded corners; and an end surface of the plasmon antenna which is opposite to the flat end surface and receives light, is inclined with respect to the flat end surface so as to become closer to the flat end surface toward one of the at least three vertexes or rounded corners. When the light-receiving end surface of the plasmon antenna is irradiated with the light, a near-field light having a sufficient intensity can be generated at only the vertex or rounded corner toward which the entire plasmon antenna becomes thinner.

11 Claims, 14 Drawing Sheets

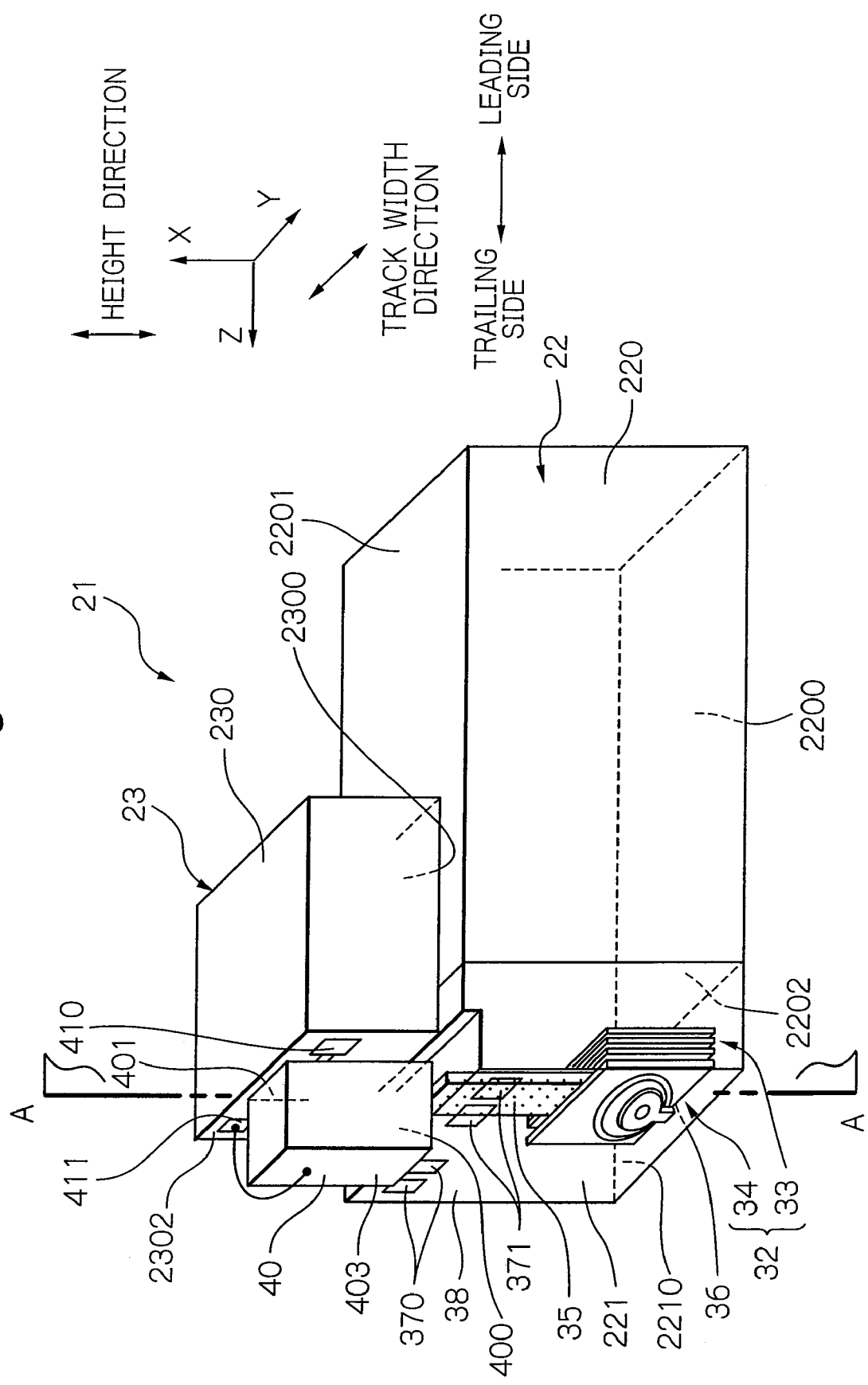

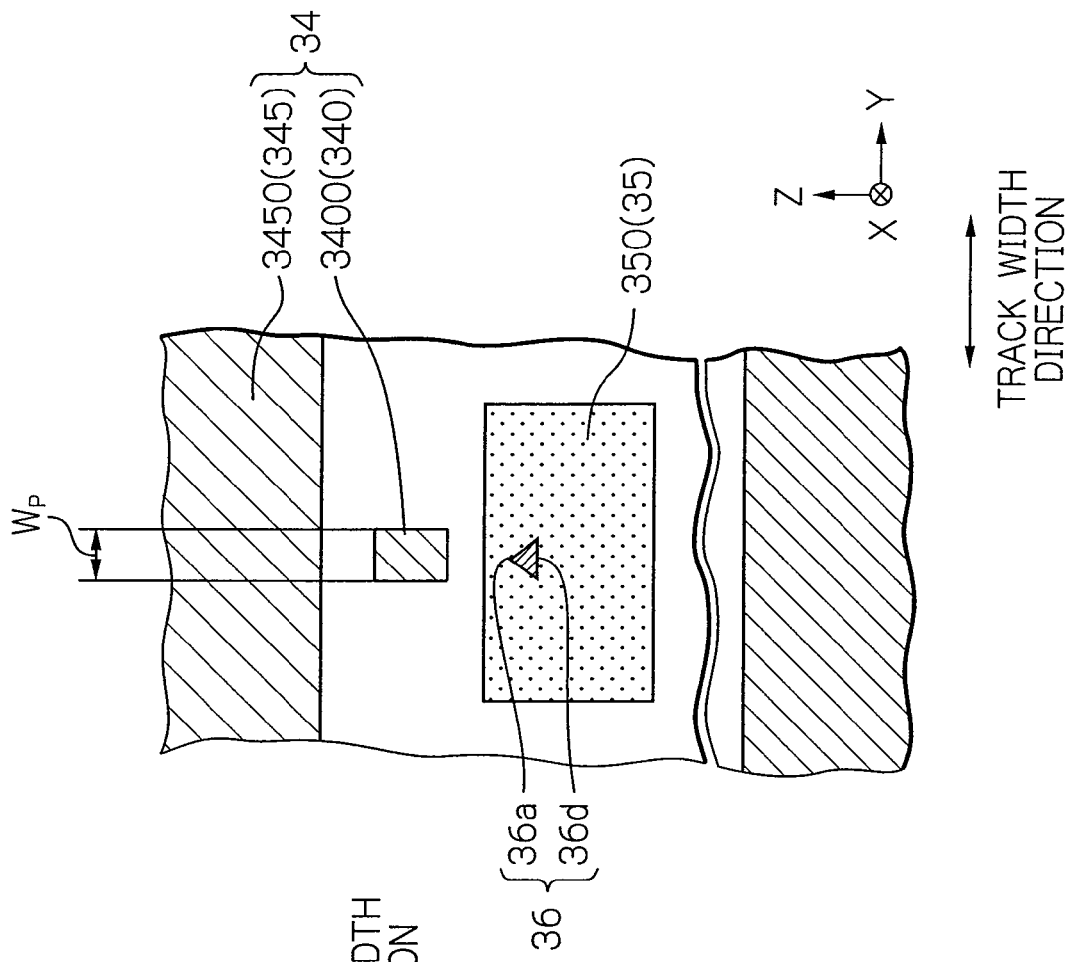
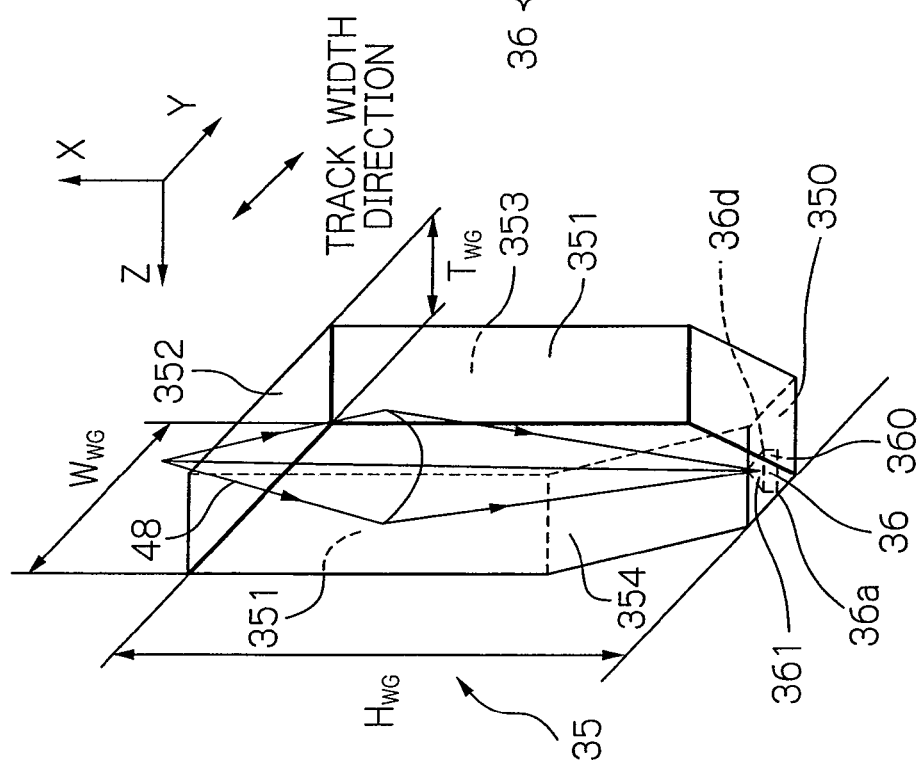

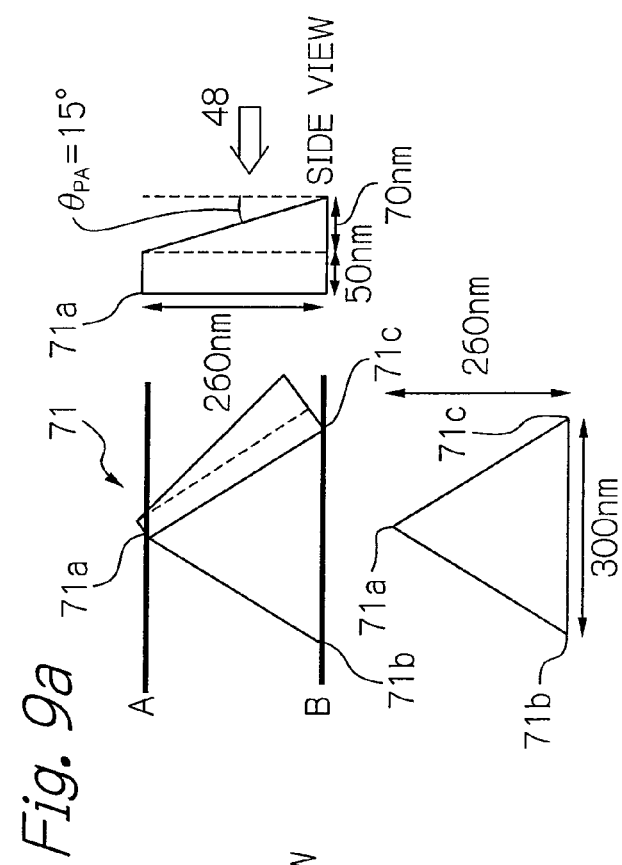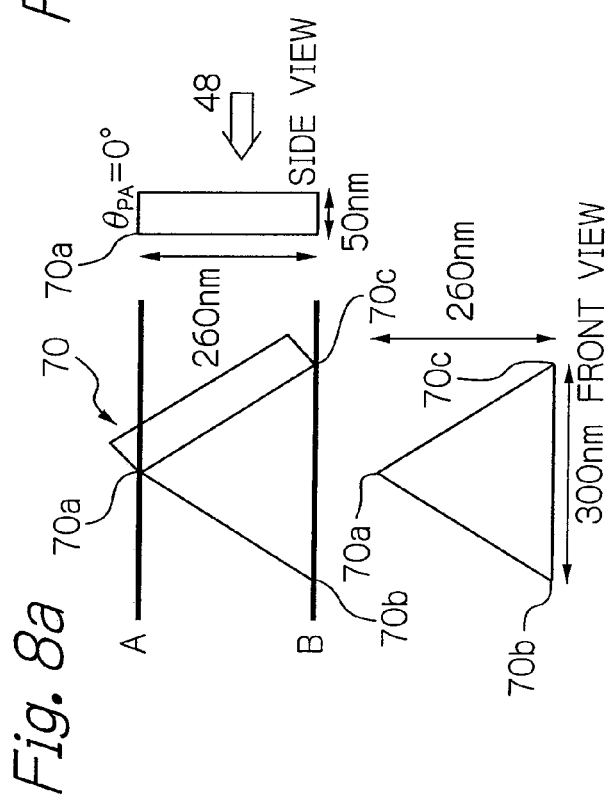

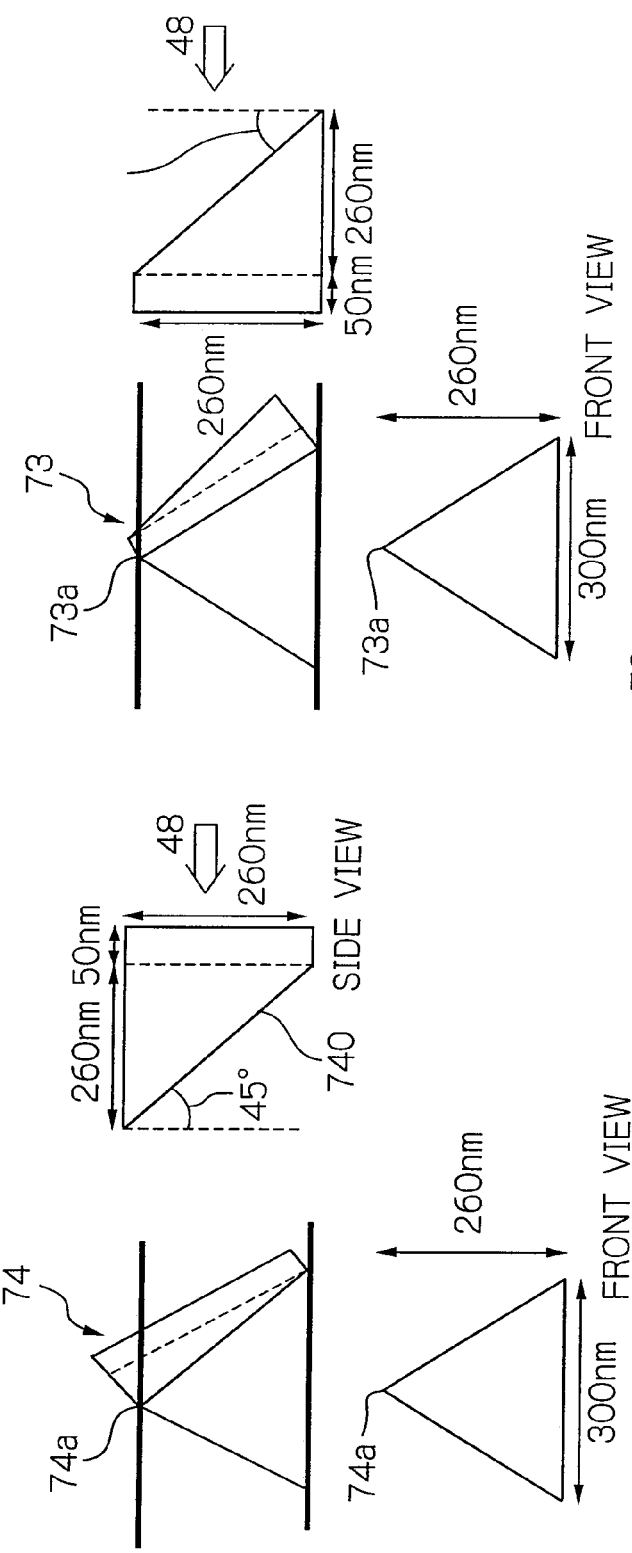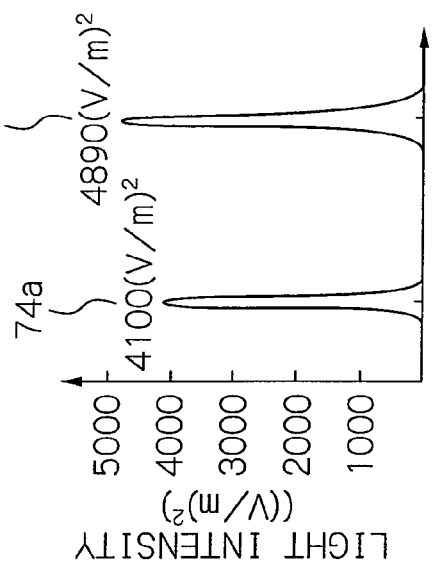

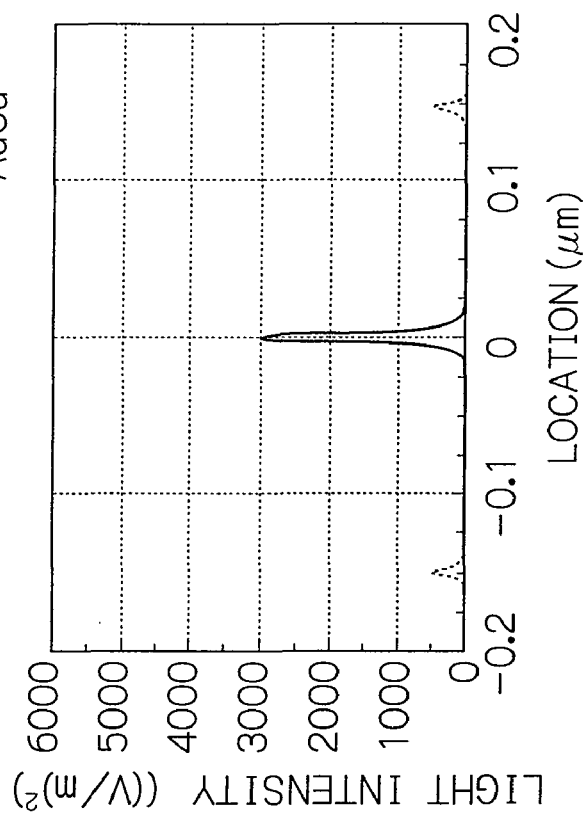
Fig. 14b  AuCu
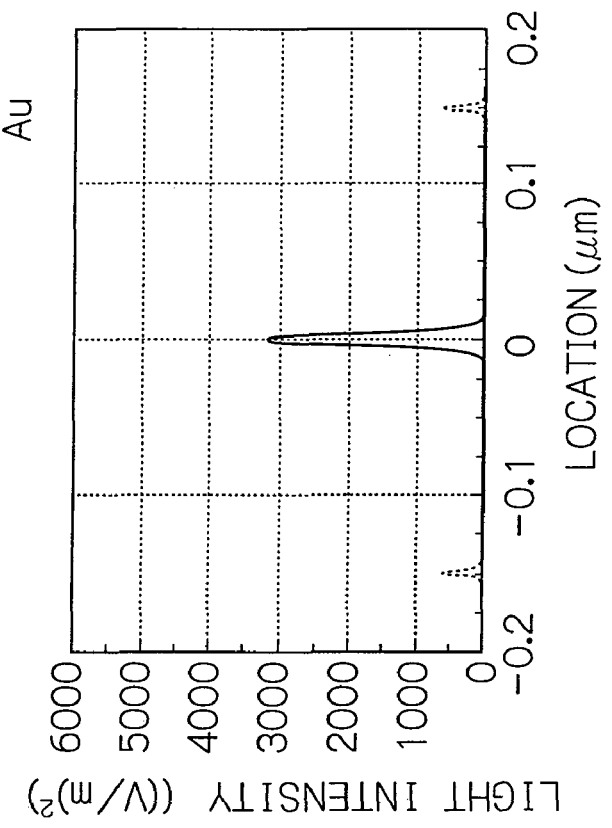
Fig. 14a  Au

HEAT ASSISTED MAGNETIC RECORDING HEAD COMPRISING PLASMON ANTENNA WITH FLAT SURFACES OPPOSED TO MEDIUM

BACKGROUND OF THE INVENTION

1. Field of the Invention

The present invention relates to a plasmon antenna that generates near-field light by receiving light, and to a heat-assisted magnetic recording head for writing data with the plasmon antenna by heat-assisted magnetic recording technique.

2. Description of the Related Art

As the recording density of a magnetic recording apparatus, such as a magnetic disk apparatus, becomes higher, further improvement has been required in the performance of a thin-film magnetic head and a magnetic recording medium. As the thin-film magnetic head, a composite-type thin-film magnetic head is widely used, which has a stacked structure of a magnetoresistive (MR) element for reading data and an electromagnetic transducer for writing data.

Whereas, the magnetic recording medium is generally a kind of discontinuous body of magnetic microparticles gathered together. Here, one record bit consists of a plurality of the magnetic microparticles. Therefore, in order to improve the recording density, it is necessary to decrease the size of the magnetic microparticles and reduce irregularity in the boundary of the record bit. However, the decrease in size of the magnetic microparticles raises a problem of degradation of thermal stability of magnetization due to decrease in volume.

As a measure against the thermal stability problem, it may be possible to increase the magnetic anisotropy energy $K_U$ of the magnetic microparticles. However, the increase in energy $K_U$ causes the increase in anisotropic magnetic field (coercive force) of the magnetic recording medium. Whereas, write field intensity of the thin-film magnetic head is limited by the amount of saturation magnetic flux density of the soft-magnetic pole material of which the magnetic core of the head is formed. Therefore, the head cannot write data to the magnetic recording medium when the anisotropic magnetic field (coercive force) of the medium exceeds the write field limit.

Recently, as a method for solving this problem of thermal stability, so-called a heat-assisted magnetic recording technique is proposed, in which writing is performed by reducing the anisotropic magnetic field with heat supplied to the magnetic recording medium formed of magnetic material with a large $K_U$ just before application of the write field. For the heat-assisted magnetic recording technique, a method has been intensively developed, in which a near-field light probe, so-called a plasmon antenna, is used for generating near-field light, and the near-field light is irradiated to the magnetic recording medium. For example, U.S. Pat. No. 6,768,556 B1 discloses a near-field light probe that includes a metal scatterer with a strobilus shape formed on a substrate and a dielectric material film formed around the metal scatterer. And U.S. Pat. No. 6,649,894 B2 discloses a near-field light probe made of a flat scatterer formed on the surface of a substrate. Further, US Patent Publication No. 2004/0085862 A1 discloses a near-field light probe that has a beak portion directed toward a magnetic recording medium, so-called a nano-beak type near-field light probe.

However, when the heat-assisted magnetic recording is intended to be realized by using such a plasmon antenna as described above, a difficult problem, which will be described hereinafter, may occur.

Generally when a plasmon antenna, which is a polygonal flat plate, is irradiated with laser light, near-field light is generated at the location of each of the corners. For example, it has been confirmed that when a flat plate with the shape of a triangle ABC is irradiated with a TM polarization light having an electric field component perpendicular to the bottom edge of the triangle, a near-field light having about a half the intensity of the near-field light generated at a vertex A is generated at each of vertexes B and C which is at both ends of the bottom edge. Specifically, the near-field light intensity ratio is such that vertex A:vertex B:vertex C=2:1:1.

However, it is ideal that the near-field light to be irradiated to a magnetic recording medium is generated at only one spot in a plasmon antenna. By using the near-field light that is generated at only one spot, only the desired record bit can be formed. On the contrary, for example, if a near-field light with a considerable intensity is generated at each of the three vertexes as described above, there arises the fear that two record bits other than the desired record bit are formed on the magnetic recording medium. In order to form only the desired record bit, the intensity ratio of the desired near-field light and each of the incidentally-generated near-field light is actually required to be at least 5:1. Thus, it has been difficult to realize the plasmon antenna in which only the desired near-field light among the generated near-field lights has a sufficient intensity.

SUMMARY OF THE INVENTION

Accordingly, an object of the present invention is to provide a plasmon antenna in which a near-field light having a sufficient intensity is generated only in a desired location, and to provide a heat-assisted magnetic recording head that includes the plasmon antenna and is capable of forming only the desired record bit. Further, an object of the present invention is to provide a head gimbal assembly (HGA) including the head, and further to provide a magnetic recording apparatus including the HGA.

Further, another object of the present invention is to provide a plasmon antenna which is relatively easy to produce.

Some terms used in the specification will be defined before explaining the present invention. In a layered structure or an element structure formed on an element-integration surface of a slider substrate of the head according to the present invention, when viewed from a standard layer or element, a substrate side is defined as "lower" side, and the opposite side as an "upper" side. In a certain layer or element, a portion on the substrate side is defined as a "lower portion", and a portion on the opposite side as an "upper portion". Further, in embodiments of the head according to the present invention, "X-, Y- and Z-axis directions" are indicated in some figures as needed. Here, Z-axis direction indicates above-described "up-and-low" direction, and +Z direction corresponds to a trailing side and −Z direction to a leading side. And Y-axis direction indicates a track width direction, and X-axis direction indicates a height direction.

According to the present invention, a plasmon antenna is provided, which comprises an end surface on a side where a near-field light is generated; the end surface is flat and has a shape with at least three vertexes or rounded corners; and an end surface of the plasmon antenna which is opposite to the flat end surface and receives light, is inclined with respect to the flat end surface so as to become closer to the flat end surface toward one of the at least three vertexes or rounded corners. When the light-receiving end surface of the plasmon antenna is irradiated with the light, a near-field light having a sufficient intensity can be generated at only the vertex or rounded corner toward which the entire plasmon antenna becomes thinner.

In the plasmon antenna according to the present invention, an inclination angle of the end surface receiving the light with respect to the flat end surface is preferably in a range from 10 degrees to 60 degrees. By this setting, the intensity ratio of the desired near-field light and each of the near-field lights that are incidentally generated can be made sufficiently high (at least 5:1). Further, the plasmon antenna is preferably formed of one element selected from a group of Au, Ag, Al, Cu, Pd, Pt, Rh and Ir, or of an alloy made of at least two elements selected from the group. Furthermore, the flat end surface preferably has a shape of an isosceles triangle.

According to the present invention, a heat-assisted magnetic recording head is further provided, which comprises in an element-integration surface of a substrate: a write head element for writing data to a magnetic recording medium; a plasmon antenna; and a waveguide for guiding light to the plasmon antenna, an end surface on a side where a near-field light is generated of the plasmon antenna, being a flat portion of an opposed-to-medium surface of the head and having a shape with at least three vertexes or rounded corners, and an end surface of the plasmon antenna which is opposite to the flat end surface and receives the light, being inclined with respect to the flat end surface so as to become closer to the flat end surface toward one of the at least three vertexes or rounded corners.

In the above-described heat-assisted magnetic recording head, when the light-receiving end surface of the plasmon antenna is irradiated with the light, a near-field light having a sufficient intensity can be generated at only the vertex or rounded corner toward which the entire plasmon antenna becomes thinner. Thereby, only the desired record bit can be formed.

Further, in the heat-assisted magnetic recording head according to the present invention, it is preferable that a light source is provided on a side opposite to the opposed-to-medium surface of the head, and the waveguide includes an end surface that receives light from the light source on a side opposite to the opposed-to-medium surface.

Further, according to the present invention, a head gimbal assembly (HGA) is provided, which comprises: a suspension; and the above-described heat-assisted magnetic recording head fixed on the suspension.

Furthermore, according to the present invention, a magnetic recording apparatus is provided, which comprises:

at least one head gimbal assembly comprising a suspension and the above-described heat-assisted magnetic recording head fixed on the suspension;

at least one magnetic recording medium; and a recording and light-emission control circuit for controlling a light emission operation for the light propagating through the waveguide, and for controlling a write operation performed by the heat-assisted magnetic recording head to the at least one magnetic recording medium.

Further objects and advantages of the present invention will be apparent from the following description of preferred embodiments of the invention as illustrated in the accompanying figures. In each figure, the same element as an element shown in other figure is indicated by the same reference numeral. Further, the ratio of dimensions within an element and between elements becomes arbitrary for viewability.

BRIEF DESCRIPTION OF THE DRAWINGS

FIG. 2 shows a perspective view illustrating one embodiment of thin-film magnetic head according to the present invention;

FIG. 3a shows a perspective view illustrating one embodiment of waveguide and plasmon antenna;

FIG. 3b shows a plain view illustrating the shapes, on the head-part end surface, of the ends of electromagnetic transducer, waveguide and plasmon antenna;

FIGS. 8a and 8b show a schematic view illustrating a plasmon antenna used for comparative example 1 (one edge: 300 nm), and a graph illustrating the result of the simulation experiment in comparative example 1, respectively;

FIGS. 9a and 9b show a schematic view illustrating a plasmon antenna used for practical example 1, and a graph illustrating the result of the simulation experiment in example 1 (one edge: 300 nm), respectively;

FIGS. 13a to 13c show schematic views illustrating the conventional nano-beak type plasmon antenna and the plasmon antenna of practical example 3, and a graph comparing the near-field light intensities in both the plasmon antennas; and FIGS. 14a and 14b show graphs illustrating the near-field light intensities in the plasmon antennas according to the present invention formed of different constituent materials.

DESCRIPTION OF THE PREFERRED EMBODIMENTS

Figure 1:
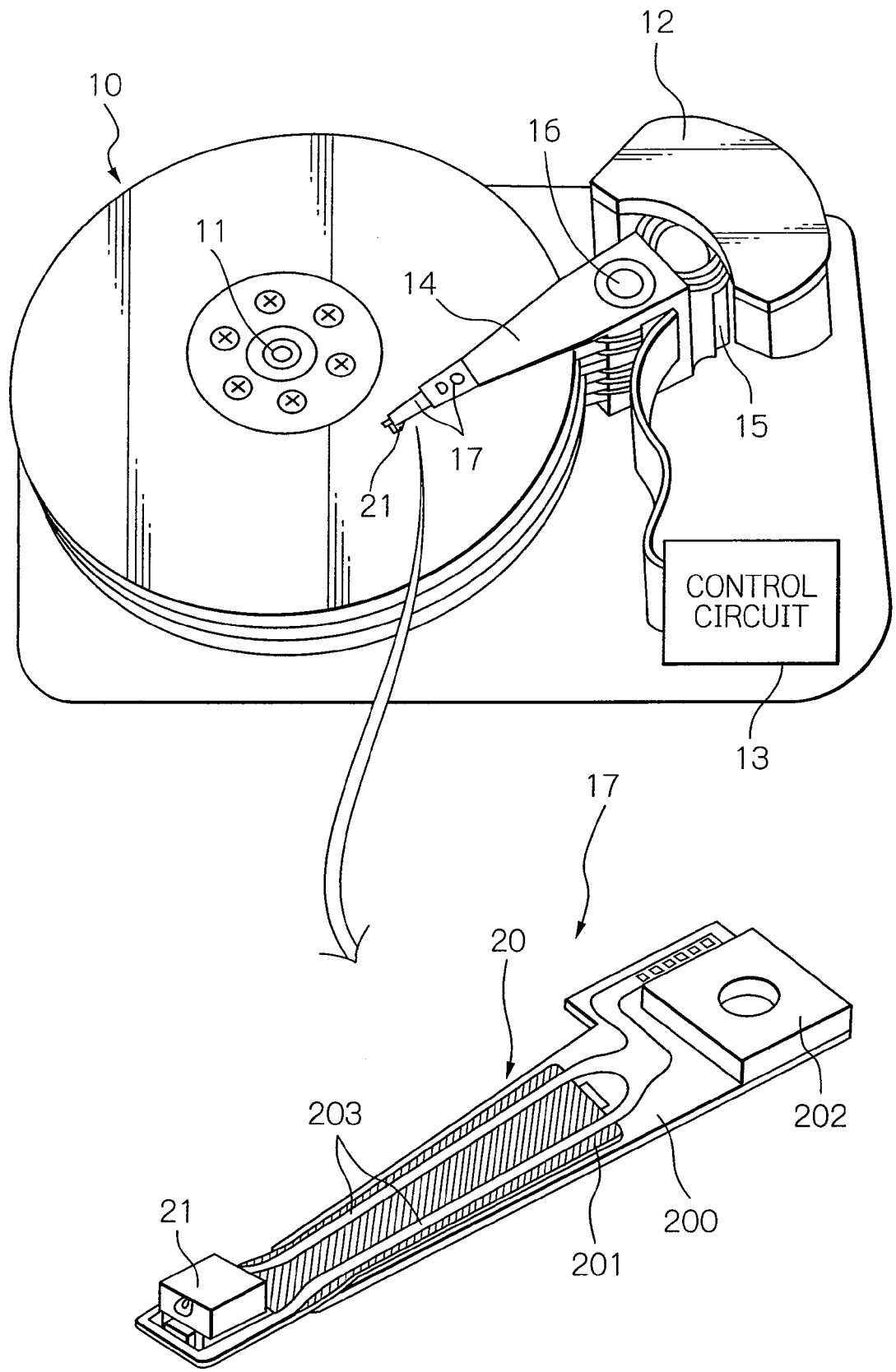
FIG. 1 shows a perspective view schematically illustrating a structure of a major part in one embodiment of a magnetic recording apparatus and an HGA according to the present invention.

FIG. 1 shows a perspective view schematically illustrating a structure of a major part in one embodiment of a magnetic recording apparatus and an HGA according to the present invention. Here, in the perspective view of the HGA, the side of the HGA, opposed to the surface of the magnetic recording medium, is presented as the upper side.

A magnetic disk apparatus as a magnetic recording apparatus shown in FIG. 1 includes: a plurality of magnetic disks 10 as magnetic recording media, rotating around a rotational axis of a spindle motor 11; an assembly carriage device 12 provided with a plurality of drive arms 14 thereon; a head gimbal assembly (HGA) 17 attached on the top end portion of each drive arm 14 and provided with a thin-film magnetic head 21 as a heat-assisted magnetic recording head; and a recording/reproducing and light-emission control circuit 13 for controlling write/read operations of the thin-film magnetic head 21 and further for controlling the emission operation of a laser diode as a light source that generates laser light for heat-assisted magnetic recording, which will be described later.

In the present embodiment, the magnetic disk 10 is designed for perpendicular magnetic recording, and has a structure in which sequentially stacked on a disk substrate is: a soft-magnetic under layer; an intermediate layer; and a magnetic recording layer (perpendicular magnetization layer). The assembly carriage device 12 is a device for positioning the thin-film magnetic head 21 above a track formed on the magnetic recording layer of the magnetic disk 10, on which recording bits are aligned. In the apparatus, the drive arms 14 are stacked in a direction along a pivot bearing axis 16 and can be angularly swung around the axis 16 by a voice coil motor (VCM) 15. The structure of the magnetic disk apparatus according to the present invention is not limited to that described above. For instance, the number of each of magnetic disks 10, drive arms 14, HGAs 17 and slider 21 may be one.

Referring also to FIG. 1, a suspension 20 in the HGA 17 includes a load beam 200, a flexure 201 with elasticity fixed to the load beam 200, and a base plate 202 provided on the base portion of the load beam 200. Further, on the flexure 201, there is provided a wiring member 203 that is made up of lead conductors and connection pads electrically joined to both ends of the lead conductors. The thin-film magnetic head 21 is fixed to the flexure 201 at the top end portion of the suspension 20 so as to face the surface of each magnetic disk 10 with a predetermined space (flying height). Moreover, one ends of the wiring member 203 are electrically connected to terminal electrodes of the heat-assisted magnetic recording head 21.

The structure of the suspension 20 is not limited to the above-described one. An IC chip for driving the head may be mounted midway on the suspension 20, though not shown.

FIG. 2 shows a perspective view illustrating one embodiment of thin-film magnetic head 21 according to the present invention.

As shown in FIG. 2, a thin-film magnetic head 21 as a heat-assisted magnetic recording head is constituted of the slider 22 and the light source unit 23 as described above. The slider 22 includes: a slider substrate 220 having an ABS 2200 processed so as to provide an appropriate flying height, and formed of, for example, AlTiC ($Al_2O_3$—TiC); and a head part 221 formed on an element-integration surface 2202 perpendicular to the ABS 2200. While, the light source unit 23 includes: a unit substrate 230 having an joining surface 2300, and formed of, for example, AlTiC ($Al_2O_3$—TiC); and a laser diode 40 as a light source provided on a source-installation surface 2302 perpendicular to the joining surface 2300. The slider 22 and the light source unit 23 are bonded to each other so that the back surface 2201 of the slider substrate 220 and the joining surface 2300 of the unit substrate 230 have a surface contact with each other. Here, the back surface 2201 of the slider substrate 220 is defined as an end surface opposite to the ABS 2200 of the slider substrate 220.

In the slider 22, the head part 221 formed on the element-integration surface 2202 of the slider substrate 220 includes: a head element 32 constituted of a magnetoresistive (MR) element 33 for reading data from the magnetic disk and an electromagnetic transducer 34 for writing data to the magnetic disk; a plasmon antenna 36 as a near-field light generating element for generating near-field light, in which one end surface is a portion of the opposed-to-medium surface of the head; a waveguide 35 for guiding the laser light from a laser diode 40 as a light source provided in the light source unit 23 to the plasmon antenna 36; an overcoat layer 38 formed on the element-integration surface 2202, so as to cover the MR element 33, the electromagnetic transducer 34 and the waveguide 35 (the plasmon antenna 36); a pair of terminal electrodes 370 exposed in the upper surface of the overcoat layer 38 and electrically connected to the MR element 33; and a pair of terminal electrodes 371 also exposed in the upper surface of the overcoat layer 38 and electrically connected to the electromagnetic transducer 34. The terminal electrodes 370 and 371 are electrically connected to the connection pads of the wiring member 203 provided on the flexure 201 (FIG. 1).

One ends of the MR element 33, the electromagnetic transducer 34 and the plasmon antenna 36 reach the head-part end surface 2210 of the head part 221, which is opposed to the medium surface. Here, the head-part end surface 2210 and the ABS 2200 constitute the whole opposed-to-medium surface of the thin-film magnetic head 21. During actual write and read operations, the thin-film magnetic head 21 aerodynamically flies above the surface of the rotating magnetic disk with a predetermined flying height. Thus, the ends of the MR element 33 and electromagnetic transducer 34 face the surface of the magnetic record layer of the magnetic disk with a appropriate magnetic spacing. Then, MR element 33 reads data by sensing signal magnetic field from the magnetic record layer, and the electromagnetic transducer 34 writes data by applying signal magnetic field to the magnetic record layer. When writing data, laser light, which is generated from the laser diode 40 of the light source unit 23 and propagates through the waveguide 35, is irradiated onto the plasmon antenna 36. The irradiation causes near-field light to be generated from the plasmon antenna 36. The generated near-field light reaches the magnetic recording layer of the magnetic disk, and heats a portion of the magnetic record layer. As a result, the anisotropic magnetic field (coercive force) of the portion is decreased to a value that enables writing; thus the heat-assisted magnetic recording can be accomplished.

In the present embodiment, the waveguide 35 and the plasmon antenna 36 are provided between the MR element 33 and the electromagnetic transducer 34, that is, on the leading side (−Z direction) of the electromagnetic transducer 34. Thus, the portion of the magnetic recording layer that is heated by being irradiated with the near-field light from the plasmon antenna 36 receives a write magnetic field immediately. Thereby, a favorable write operation can be carried out. The locations of the waveguide 35 and the plasmon antenna 36 is not limited to the above-described locations; the plasmon antenna 36 may have only to be provided adjacent to the end on the head-part end surface 2210 side of the electromagnetic transducer 34. Further, the thin-film magnetic head 21 may have the form in which the laser diode 40 is directly mounted on the slider 22 without using the light source unit 23.

Also according to FIG. 2, the light source unit 23 includes: the unit substrate 230; the laser diode 40 provided on the source-installation surface 2302 of the unit substrate 23; the terminal electrode 410 electrically connected to the lower surface 401 as an electrode of the laser diode 40; and the terminal electrode 411 electrically connected to the upper surface 403 as an electrode of the laser diode 40. The terminal electrodes 410 and 411 are electrically connected to the connection pads of the wiring member 203 provided on the flexure 201 (FIG. 1). By applying a predetermined voltage between both electrodes 410 and 411 of the laser diode 40, laser light radiates from the emission center on an emission surface 400 of the laser diode 40.

As explained above, the heat-assisted magnetic recording head 21 has a structure in which the slider 22 and the light source unit 23 are joined to each other. In the joining, the joining surface 2300 of the unit substrate 230 is made having a surface contact with the back surface 2201. Then, the locations of the unit substrate 230 and the slider substrate 220 are determined so that the laser light generated from the laser diode 40 can be directly entered to the end surface 352 opposite to the ABS 2200 of the waveguide 35. Each of the slider 22 and light source unit 23 may have an arbitrary size. For example, the slider 22 may be so-called a femto slider in which the width in the track width direction (Y-axis direction) is 700 µm; the length in Z-axis direction is 850 µm; and the thickness in X-axis direction is 230 µm. In the case, the light source unit 23 may be one size smaller than the slider 22, for example, in which the width in the track width direction is 425 µm; the length is 300 µm; and the thickness is 300 µm.

FIG. 3a shows a perspective view illustrating one embodiment of waveguide 35 and plasmon antenna 36. Further, FIG. 3b shows a plain view illustrating the shapes, on the head-part end surface 2210, of the ends of electromagnetic transducer 34, waveguide 35 and plasmon antenna 36.

The waveguide 35 is positioned, in the present embodiment, parallel to the element-integration surface 2202 and between the MR element 33 and the electromagnetic transducer 34 as described above. And the waveguide 35 extends from its end surface 350 on the head-part end surface 2210 to the opposite end surface 352 on the head-part end surface 2211, as shown in FIG. 3a. The waveguide 35 may have a rectangular parallelepiped shape, or may have a portion on the head-part end surface 2210 side, which tapers in the track width direction (Y-axis direction). The width $W_{WG}$ in the track width direction (Y-axis direction) of the waveguide 35 may be, for example, in the range approximately from 1 to 200 µm (micrometers), and the thickness $T_{WG}$ (in Z-axis direction) may be, for example, in the range approximately from 2 to 10 µm, and the height (length) $H_{WG}$ (in X-axis direction) may be, for example, in the range approximately from 10 to 300 µm.

Further, both the side surfaces 351, the lower surface 353 and the upper surface 354 of the waveguide 35 have a contact with the overcoat layer 38 (FIG. 2). The waveguide 35 is formed of a dielectric material with refractive index n higher than that of the constituent material of the overcoat layer 38, made by using, for example, a sputtering method. For example, in the case that the overcoat layer 38 is formed of $SiO_2$ (n=1.5), the waveguide 35 can be formed of, for example, $Al_2O_3$ (n=1.63). Further, in the case that the overcoat layer 38 is formed of $Al_2O_3$ (n=1.63), the waveguide 35 can be formed of, for example, $SiO_XO_Y$ (n=1.7-1.85), $Ta_2O_5$ (n=2.16), $Nb_2O_5$ (n=2.33), TiO (n=2.3-2.55) or $TiO_2$ (n=2.3-2.55). This material structure of the waveguide 35 not only enables the propagation loss of laser light to be reduced due to the excellent optical characteristics of the constituent material, but also provides the total reflection in both the side surfaces 351, the lower surface 353 and the upper surface 354 due to the existence of the overcoat layer 38 as a clad. As a result, more amount of laser light can reach the plasmon antenna 36, which improves the efficiency of generating near-field light.

Furthermore, it is preferable that the waveguide 35 has a multilayered structure of dielectric materials in which the upper a layer is, the higher becomes the refractive index n of the layer. The multilayered structure can be realized, for example, by sequentially stacking dielectric materials of $SiO_XN_Y$ with the composition ratio X and Y appropriately changed. The number of stacked layers may be, for example, in the range from 8 to 12. In the case that laser light 48 has a liner polarization (TM polarization) in which the vibration of electric field component of the laser light 48 is in Z-axis direction, the above-described structure enables a light spot on the end surface 350 of the laser light 48 to be closer to the electromagnetic transducer 34 (on the trailing side) in Z-axis direction (in the direction along thickness $T_{WG}$). As a result, the plasmon antenna 36 can be provided much closer to the electromagnetic transducer 34 (on the trailing side) on the end surface 350. That is, the apex 36a of the plasmon antenna 36 is positioned more adjacent to the edge on the leading side of the main magnetic pole 3400 of the electromagnetic transducer 34 described later, which enables near-field light to be irradiated more adequately on the write position at the time of writing.

As shown in FIGS. 3a and 3b, a plasmon antenna 36 is disposed on the end surface 350 of the waveguide 35, and is a conductor member formed of a metal or the like with its one end surface reaching a head-part end surface 2210. In the plasmon antenna 36, an end surface 360 that is opposed to a magnetic disk and is on the side where a near-field light is generated has a shape that is flat and has at least three vertexes or rounded corners. Further, an end surface 361 that is on the opposite side to the flat end surface 360 and receives the laser light 48 is inclined with respect to the flat end surface 360 so as to become closer to the flat end surface 360 toward one of at least these three vertexes or rounded corners.

In the present embodiment, the end surface 360 has a shape of an isosceles triangle having a vertex 36a on the trailing side (+Z direction) and a bottom edge 36d, and the end surface 361 becomes closer to the end surface 360 toward the vertex 36a. As a result, the entire plasmon antenna 36 becomes thinner toward the vertex 36a. When the light-receiving end surface 361 of the plasmon antenna 36 is irradiated with the laser light 48, a near-field light having a sufficient intensity can be generated at only the vertex 36a toward which the entire plasmon antenna 36 becomes thinner. The structure and operation of the plasmon antenna 36 will be described in detail later with use of FIG. 5.

Further, according to FIG. 3b, the vertex 36a of the plasmon antenna 36 is disposed in the vicinity of the edge on the leading side of a main magnetic pole layer 340 of the electromagnetic transducer 34, which will be described layer, so as to be opposed to the edge of the main magnetic pole layer 340. Here, when viewed from the head-part end surface 2210 side (namely, according to FIG. 3b), the main magnetic pole layer 340 has a rectangular or trapezoidal shape. When the plasmon antenna 36 is irradiated with the laser light 48 in such a configuration on the head-part end surface 2210, a near-field light sufficient to heat the magnetic recording layer of the magnetic disk is generated only in the vicinity of the vertex 36a. Specifically, only the region adjacent to the vertex 36a exerts the heat assist action that heats a portion of the magnetic recording layer of the magnetic disk. Like this, the vertex 36a that is the center of the heat action portion is in the location very near to the main magnetic pole layer 340 which is a write portion, and therefore, a write magnetic field with a sufficient intensity can be applied immediately after heat is applied to the portion of the magnetic recording layer of the magnetic disk. Thereby, a stable write operation with heat assist can be carried out.

Figure 4:
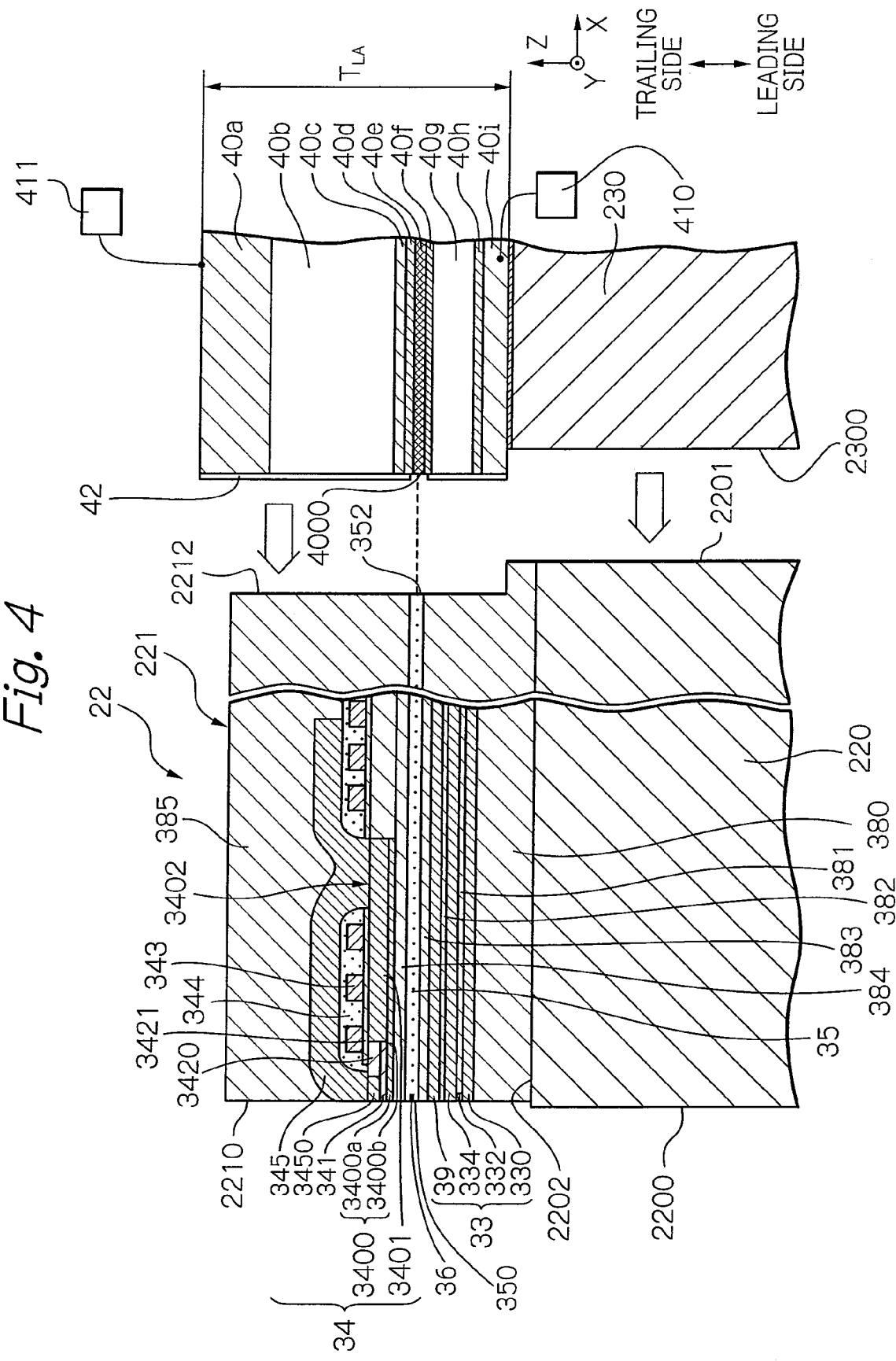
FIG. 4 shows a cross-sectional view taken by plane A in FIG. 2, schematically illustrating a main part of the thin-film magnetic head.

FIG. 4 shows a cross-sectional view taken by plane A in FIG. 2, schematically illustrating a main part of the thin-film magnetic head 21.

As shown in FIG. 4, the MR element 33 is formed on the insulating layer 380 stacked on the element-integration surface 2202, and includes: an MR multilayer 332; and a lower shield layer 330 and an upper shield layer 334 which sandwich the MR multilayer 332 and the insulating layer 381 therebetween. The upper and lower shield layers 334 and 330 prevent the MR multilayer 332 from receiving external magnetic field as a noise. The upper and lower shield layers 334 and 330 are magnetic layers formed of soft-magnetic materials such as NiFe (Permalloy), FeSiAl (Sendust), CoFeNi, CoFe, FeN, FeZrN or CoZrTaCr, or the multilayer of at least two of these materials, with thickness of approximately 0.5 to 3 μm.

The MR multilayer 332 is a magneto-sensitive part for detecting signal magnetic field by using MR effect. The MR multilayer 332 may be, for example: a current-in-plane giant magnetoresistive (CIP-GMR) multilayer that utilizes CIP-GMR effect; a current-perpendicular-to-plane giant magnetoresistive (CPP-GMR) multilayer that utilizes CPP-GMR effect; or a tunnel magnetoresistive (TMR) multilayer that utilizes TMR effect. The MR multilayer 332 that utilizes any MR effect described above can detect signal magnetic field from the magnetic disk with high sensitivity. In the case that the MR multilayer 332 is a CPP-GMR multilayer or a TMR multilayer, the upper and lower shield layers 334 and 330 act as electrodes. Whereas, in the case that the MR multilayer 332 is a CIP-GMR multilayer, insulating layers are provided between the MR multilayer 332 and respective upper and lower shield layers 334 and 330; further, formed are MR lead layers that is electrically connected to the MR multilayer 332.

In the case of TMR multilayer, for example, the MR multilayer 332 may have a stacked structure in which sequentially stacked are: an antiferromagnetic layer made of, for example, IrMn, PtMn, NiMn or RuRhMn, with thickness of approximately 5 to 15 nm; a magnetization-direction-fixed layer (pinned layer) in which two ferromagnetic layers such as CoFe sandwich a non-magnetic metal layer such as Ru therebetween, and the direction of the magnetization is fixed by the antiferromagnetic layer; a tunnel barrier layer made of a non-magnetic dielectric material obtained by the process that a metal film such as Al or AlCu, for example, with thickness of approximately 0.5 to 1 nm is oxidized by oxygen introduced into the vacuum equipment, or is naturally oxidized; and a magnetization-direction-free layer (free layer) having a double-layered structure of a ferromagnetic material such as CoFe, for example, with thickness of approximately 1 nm and a ferromagnetic material such as NiFe, for example, with thickness of approximately 3 to 4 nm, which has a tunnel exchange interaction with the pinned layer through the tunnel barrier layer.

Also as shown in FIG. 4, the electromagnetic transducer 34 is designed for perpendicular magnetic recording, and includes a main magnetic pole layer 340, a gap layer 341, a write coil layer 343, a coil insulating layer 344, and a write shield layer 345.

The main magnetic pole layer 340 is provided on an insulating layer 384 made of an insulating material such as $Al_2O_3$ (alumina), and acts as a magnetic path for converging and guiding a magnetic flux toward the magnetic record layer (perpendicular magnetization layer) of the magnetic disk 10, the magnetic flux being excited by write current flowing through the write coil layer 343. The main magnetic pole layer 340 has a double-layered structure in which a main magnetic pole 3400 and a main pole body 3401 are stacked sequentially and magnetically coupled with each other. The main magnetic pole 3400 is isolated by being surrounded with an insulating layer 384 formed of an insulating material such as $Al_2O_3$ (alumina). The main magnetic pole 3400 reaches the head-part end surface 2210, and includes: a main pole front end 3400a extending to the head-part end surface 2210, with a small width $W_P$ (FIG. 3b) in the track width direction; and a main pole rear end 3400b located at the rear of the main pole front end 3400a and having a width in the track width direction larger than that of the main pole front end 3400a. Here, the small width $W_P$ of the main pole front end 3400a enables a fine write magnetic field to be generated, so that the track width can be set to be a very small value adequate for higher recording density. As shown in FIG. 3b, the main magnetic pole 340 has a rectangular or trapezoidal shape on the head-part end surface 2210. The above-described width $W_P$ is the length of the edge on the leading side of the shape, which determines the width of track formed on the magnetic recording layer of the magnetic disk. The width $W_P$ is, for example, in the range of approximately 0.05 to 0.5 μm.

Backing to FIG. 4, the main magnetic pole 3400 is formed of a soft-magnetic material with saturation magnetic flux density higher than that of the main pole body 3401, which is, for example, an iron alloy containing Fe as a main component, such as FeNi, FeCo, FeCoNi, FeN or FeZrN. The thickness of the main magnetic pole 3400 is, for example, in the range of approximately 0.1 to 0.8 μm.

The gap layer 341 forms a gap provided for separating the main magnetic pole layer 340 from the write shield layer 345 in the region near the head-part end surface. The gap layer 341 is formed, for example, of a non-magnetic insulating material such as $Al_2O_3$ (alumina), $SiO_2$ (silicon dioxide), AlN (aluminum nitride) or DLC, or formed of a non-magnetic conductive material such as Ru (ruthenium). The thickness of the gap layer 341 determines the spacing between the main magnetic pole layer 340 and the write shield layer 345, and is, for example, in the range of approximately 0.01 to 0.5 Mm.

The write coil layer 343 is formed on a insulating layer 3421 made of an insulating material such as $Al_2O_3$ (alumina), in such a way to pass through in one turn at least between the main magnetic pole layer 340 and the write shield layer 345, and has a spiral structure with a back contact portion 3402 as a center. The write coil layer 343 is formed of a conductive material such as Cu (copper). The write coil layer 343 is covered with a coil insulating layer 344 that is formed of an insulating material such as a heat-cured photoresist and electrically isolates the write coil layer 343 from the main magnetic pole layer 340 and the write shield layer 345.

The write coil layer 343 has a monolayer structure in the present embodiment, however, may have a two or more layered structure or a helical coil shape. Further, the number of turns of the write coil layer 343 is not limited to that shown in FIG. 4, and may be, for example, in the range from two to seven.

The write shield layer 345 reaches the head-part end surface 2210, and acts as a magnetic path for the magnetic flux returning from a soft-magnetic under layer that is provided under the perpendicular magnetization layer of the magnetic disk. The thickness of the write shield layer 345 is, for example, approximately 0.5 to 5 μm. Further, the write shield layer 345 has a trailing shield 3450 that is a portion opposed to the main magnetic pole layer 340. The trailing shield 3450 also extends to the head-part end surface 2210, and is provided for receiving the magnetic flux spreading from the main magnetic pole layer 340. The trailing shield 3450, according to the present embodiment, is planarized together with an insulating layer 3420 and the main pole body 3401, and has a width in the track width direction larger than the width of the main pole rear end 3400b and the main pole body 3401 as well as the main pole front end 3400a. This trailing shield 3450 causes the magnetic field gradient between the end portion of the trailing shield 3450 and the main pole front end 3400a to be steeper. As a result, a jitter of signal output becomes smaller, and therefore, error rates during read operation can be reduced. The write shield layer 345 is formed of a soft-magnetic material; especially, the trailing shield 3450 is formed of a material with high saturation magnetic flux density such as NiFe (Permalloy) or formed of an iron alloy as the main magnetic pole 3400 is formed of.

Further, in the present embodiment, an inter-element shield layer 39 is provided between the MR element 33 and the electromagnetic transducer 34, sandwiched by the insulating layers 382 and 383. The inter-element shield layer 39 plays a role for shielding the MR element 33 from the magnetic field generated from the electromagnetic transducer 34, and may be formed of the same soft-magnetic material as the upper and lower shield layers 334 and 330. The inter-element shield layer 39 is not indispensable: the embodiment without the inter-element shield layer could be in the scope of the present invention. Further, a backing coil portion may be provided between the inter-element shield layer 39 and the waveguide 35. The backing coil portion is a coil portion for generating magnetic flux to negate a magnetic flux loop that is generated from the electromagnetic transducer 34 and passes through the upper and lower shield layers 334 and 330 of the MR element 33. Thus, the backing coil portion intends to suppress wide adjacent track erasure (WATE), that is, unwanted writing or erasing to the magnetic disk.

Also according to FIG. 4, the laser diode 40 has, in the present embodiment, a multilayered structure in which sequentially stacked is: an n-electrode 40a; an n-GaAs substrate 40b; an n-InGaAlP clad layer 40c; the first InGaAlP guide layer 40d; an active layer 40e formed of multiquantum well (InGaP/InGaAlP) or the like; the second InGaAlP guide layer 40f; an p-InGaAlP clad layer 40g; a p-electrode base layer 40h; and a p-electrode 40i. On the front and rear cleaved surfaces of the multilayered structure of the laser diode 40, respectively formed are reflective layers made of, for example, $SiO_2$ or $Al_2O_3$ for exciting the oscillation by total reflection. Further, the reflective layer 42 has an opening in the position of the active layer 40e including the light-emission center 4000.

The wavelength $\lambda_L$ of the radiated laser light may be, for example, in the range of approximately 400 to 650 nm. The laser diode 40 has, for example, a thickness $T_{LA}$ of approximately 60 to 200 μm. Further, an electric source provided within the magnetic disk drive apparatus can be used for driving the laser diode 40. In fact, the magnetic disk drive apparatus usually has an electric source with applying voltage of, for example, approximately 2V, which is sufficient for the laser oscillation. The amount of electric power consumption of the laser diode 40 is, for example, in the order of several tens mW, which can be covered sufficiently by the electric source provided within the magnetic disk drive apparatus. In practice, a predetermined voltage is applied between the terminal electrode 410 connected electrically to the p-electrode 40i and the terminal electrode 411 connected electrically to the n-electrode 40a by using the electric source, to oscillate the laser diode 40. Then, laser light radiates from the opening including the emission center 4000 of the reflective layer 42.

The laser diode 40 and terminal electrodes 410 and 411 are not limited to the above-described embodiment. For example, the n-electrode 40a may be bonded on the source-installation surface 2302 of the unit substrate 230, by turning the electrodes of the laser diode 40 upside down. Further, the laser diode 40 may have another structure using other semiconducting materials such as GaAlAs system. Or the same structure as diodes usually used for optical disk storages may be adopted for the laser diode 40. Further alternatively, the thin-film magnetic head 21 may includes no laser diodes; then, the light-emission center of a laser diode provided within the magnetic disk apparatus and the end surface 352 of the waveguide 35 may be connected by using optical fiber.

Figure 5:
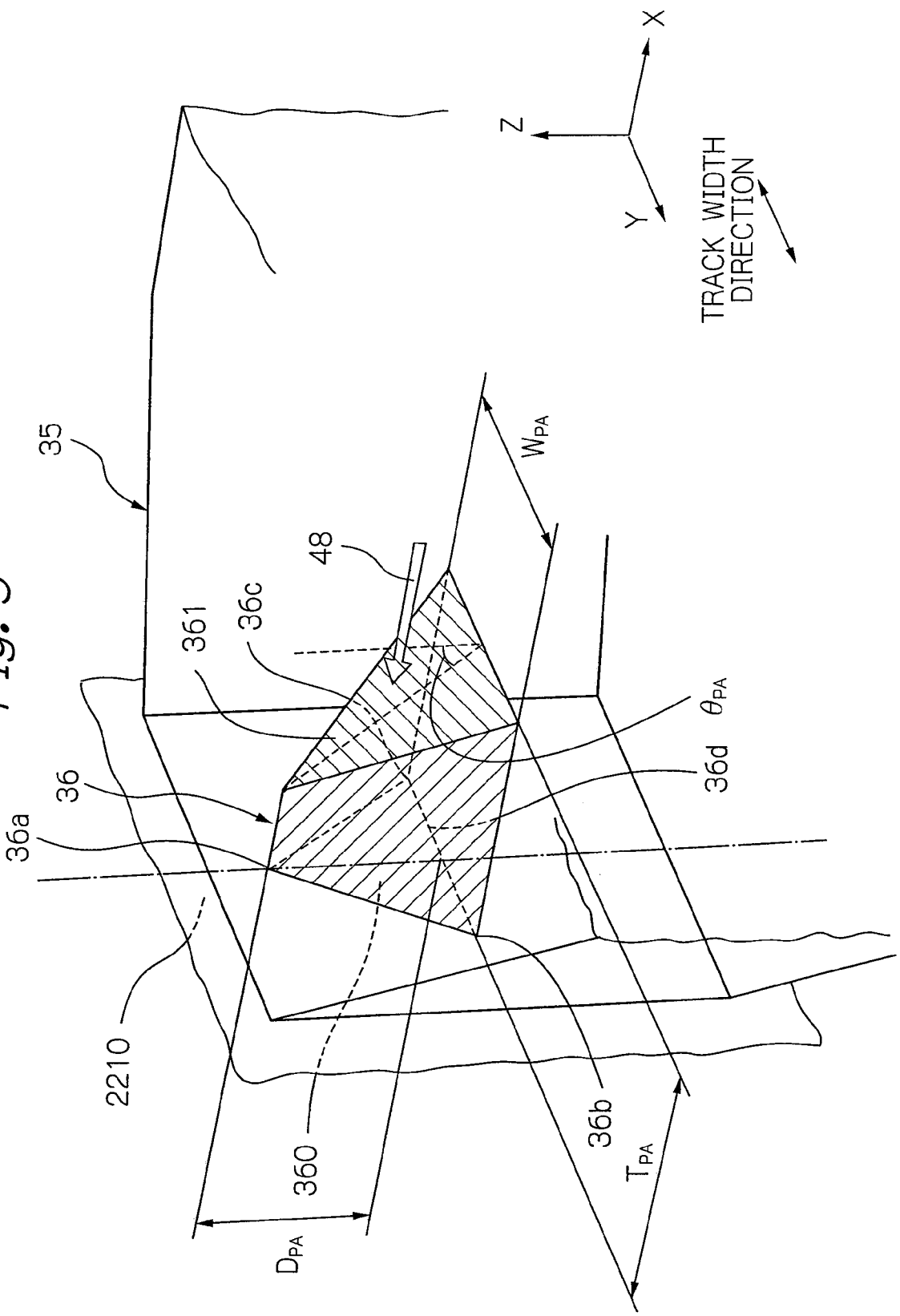
FIG. 5 shows a perspective view illustrating the structure of one embodiment of the plasmon antenna according to the present invention.

FIG. 5 shows a perspective view illustrating the structure of one embodiment of the plasmon antenna 36 according to the present invention.

According to FIG. 5, the plasmon antenna 36 includes: a flat end surface 360 that is opposed to a magnetic disk and is on the side where a near-field light is generated; and an end surface 361 that is on the opposite side to the flat end surface 360 and receives the laser light 48. The end surface 360 has, in the present embodiment, a shape of an isosceles triangle having a vertex 36a on the trailing side (+Z direction) and two vertexes 36b and 36c on the leading side (−Z direction) which are located at both ends of the bottom edge 36d. Here, the isosceles triangle shape is preferable because the distribution of the generated near-field light can be made symmetrical about the center line in the direction along the track. Further, the light-receiving end surface 361 is inclined with respect to the end surface 360 so as to become closer to the end surface 360 toward the vertex 36a. As a result, the entire plasmon antenna 36 becomes thinner toward the vertex 36a.

The plasmon antenna 36 is preferably formed of conductive material of a metal such as Au, Ag, Al, Cu, Pd, Pt, Rh or Ir, or of an alloy or the like made of at least two elements of these elements. Further, the distance $D_{PA}$ (in Z-axis direction) between the vertex 36a and the bottom edge 36d in the end surface 360 is preferably set to be sufficiently smaller than the wavelength of the incident laser light 48, and is set to be, for example, 20 to 400 nm. Further, the width $W_{PA}$ of the bottom edge 36d is also preferably set to be sufficiently smaller than the wavelength of the incident laser light 48, and is set to be, for example, 20 to 400 nm. Further, the thickness $T_{PA}$ (in X-axis direction) of the plasmon antenna 36 is preferably set at, for example, 30 to 500 nm.

When the light-receiving end surface 361 of the plasmon antenna 36 as described above is irradiated with the laser light 48, free electrons in the plasmon antenna 36 are forcefully vibrated uniformly by the electric field of the laser light 48. As a result, the plasmon is excited in the plasmon antenna 36. The plasmon generates a near-field light in the vicinity of each of the vertexes in the plasmon antenna 36. Here, according to the plasmon antenna 36 according to the present invention, the plasmon is concentrated the most intensively on the vertex 36a toward which the entire plasmon antenna 36 becomes thinner, and the near-field light having a sufficient intensity can be generated at only the vertex 36a.

In this case, an inclination angle $\theta_{PA}$ of the light-receiving end surface 361 with respect to the end surface 360 is preferably in the range from 10° to 60°. Thereby, as will be described later by using practical examples, the intensity ratio of the desired near-field light that is used for heat assist and each of the near-field lights that are incidentally generated can be made at least 5:1. As a result, a near-field light can be irradiated to only the desired location of the magnetic recording layer of the magnetic disk, and heat-assisted magnetic recording capable of forming only the desired record bit can be realized.

Figures 6A, 6B:
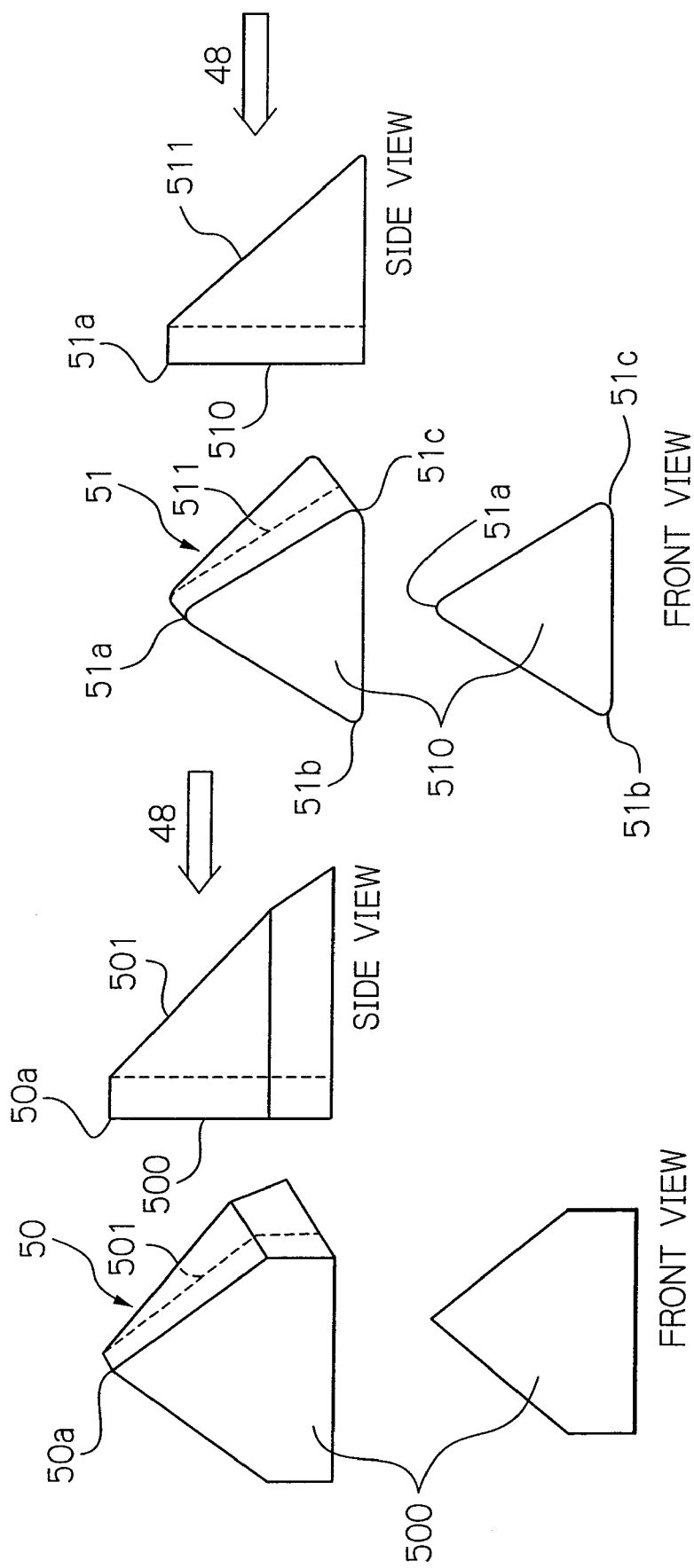
FIGS. 6a and 6b show perspective views, front views and side views illustrating other embodiments of the plasmon antenna according to the present invention.

FIGS. 6a and 6b show perspective views, front views and side views illustrating other embodiments of the plasmon antenna according to the present invention.

According to FIG. 6a, in a plasmon antenna 50, an end surface 500 which is opposed to the magnetic disk and on the side where a near-field light is generated is flat and has a pentagonal shape. Further, an end surface 501 which is on the opposite side to the flat end surface 500 and receives the laser light 48 is inclined with respect to the flat end surface 500 so as to become closer to the flat end surface 500 toward a vertex 50a which is one of five vertexes. In the constitution having such an inclination, even when the end surface which is opposed to the magnetic disk and on the side where a near-field light is generated has a polygonal shape which has more edges than a triangular shape, plasmon is concentrated the most intensively on the vertex 50a toward which the entire plasmon antenna 50 becomes thinner, and the near-field light having a sufficient intensity can be generated at only the vertex 50a.

According to FIG. 6b, in a plasmon antenna 51, an end surface 510 which is opposed to the magnetic disk and on the side where a near-field light is generated is flat and has a triangular shape having three rounded corners 51a, 51b and 51c. Further, an end surface 511 which is on the opposite side to the flat end surface 510 and receives the laser light 48 is inclined with respect to the flat end surface 510 so as to become closer to the flat end surface 510 toward the corner 51a which is one of the three corners. In the constitution having such an inclination, even when the end surface which is opposed to the magnetic disk and on the side where a near-field light is generated has a polygonal shape having at least one rounded corner, plasmon is concentrated the most intensively on the corner 51a toward which the entire plasmon antenna 51 becomes thinner, and the near-field light having a sufficient intensity can be generated at only the corner 51a. Here, the radius of curvature of the rounded corner is, for example, about 5 to 100 nm.

FIGS. 7a to 7j show perspective views and cross-sectional views for explaining one mode of forming the waveguide and the plasmon antenna.

Figure 7A:
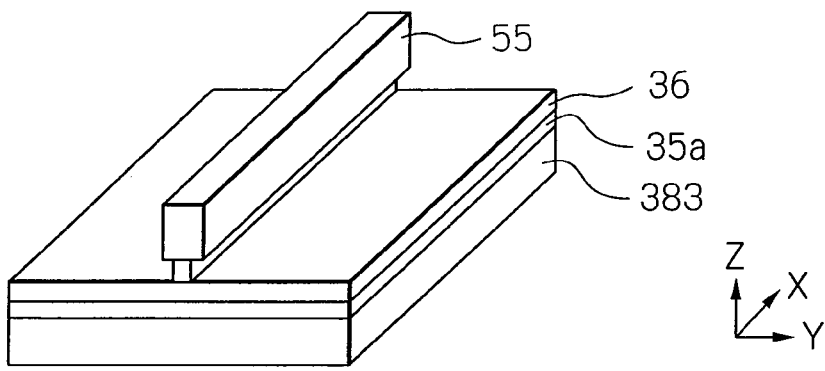
FIGS. 7a to 7j show perspective views and cross-sectional views for explaining one mode of forming the waveguide and the plasmon antenna.
Figure 7B:
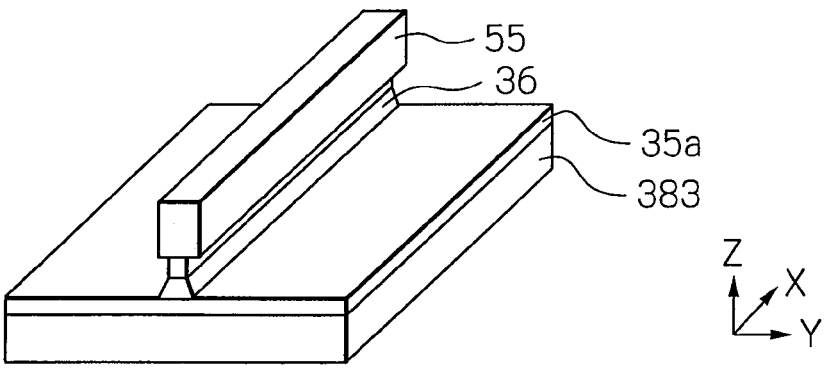
Figure 7C:
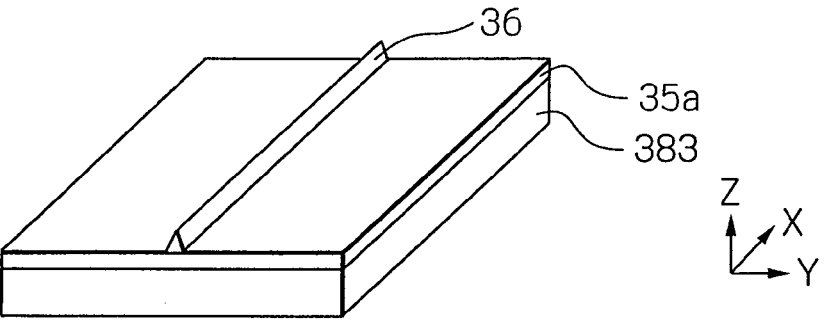

First, as shown in FIG. 7a, a dielectric film 35a that is to become a part of the waveguide is deposited on an insulating layer 383 made of $Al_2O_3$ or the like, dielectric film 35a being made of $Ta_2O_5$ or the like and having a higher refractive index than an insulating layer 383. The metal layer 36 made of Au or the like is deposited on the dielectric film 35a, and a resist pattern 55 for lift-off with its bottom portion being recessed is further formed on the metal layer 36. Subsequently, as shown in FIG. 7b, the unnecessary portion of the metal layer 36 is removed except for the portion directly beneath the resist pattern 55 by using an ion milling method or the like. Thereby, the pattern of the metal layer 36 having a trapezoidal cross-section with a wide lower portion is formed on the dielectric film 35a. Thereafter, as shown in FIG. 7c, after the resist pattern 55 is removed, a portion of each of the inclined surfaces of the metal layer 36 with the trapezoidal cross-section is removed from both the inclined surface sides by using an ion milling method; thus the metal layer 36 with a triangular section is formed.

Figure 7D:
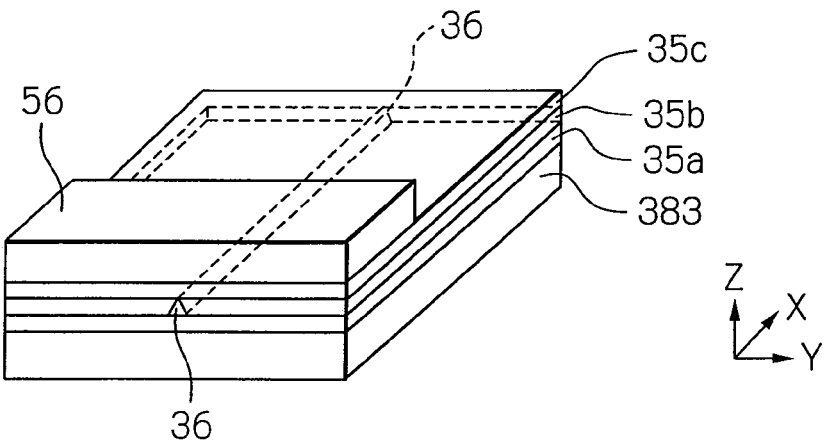
Figure 7E:
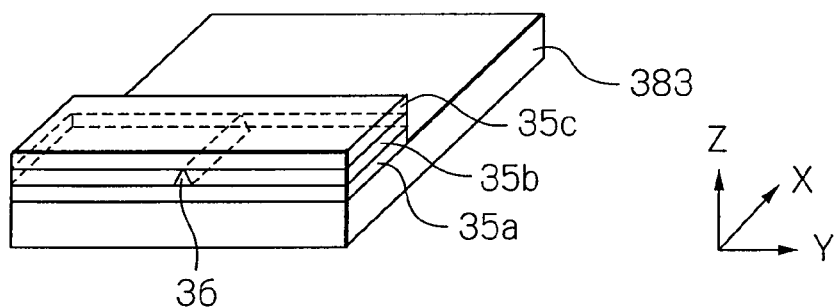

Next, as shown in FIG. 7d, a dielectric film 35b made of the same material as the dielectric film 35a is deposited on the dielectric film 35a so as to cover the metal layer 36. Further, a dielectric film 35c made of the same material as the dielectric film 35a is deposited on the dielectric film 35b. Next, a resist pattern 56 for forming the end surface of the metal layer 36 is stacked on the side where an opposed-to-medium surface is to be formed in the future. Thereafter, as shown in FIG. 7e, a portion of each of the dielectric film 35a, the metal layer 36, the dielectric film 35b and the dielectric film 35c is removed by an ion milling method.

Figure 7F:
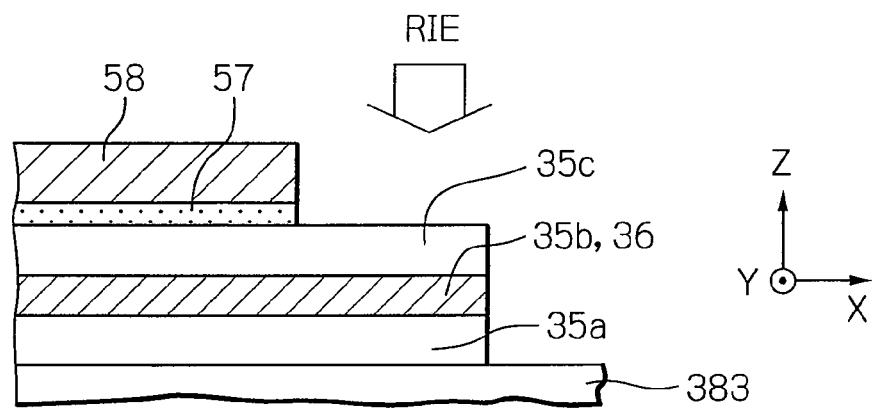
Figure 7G:
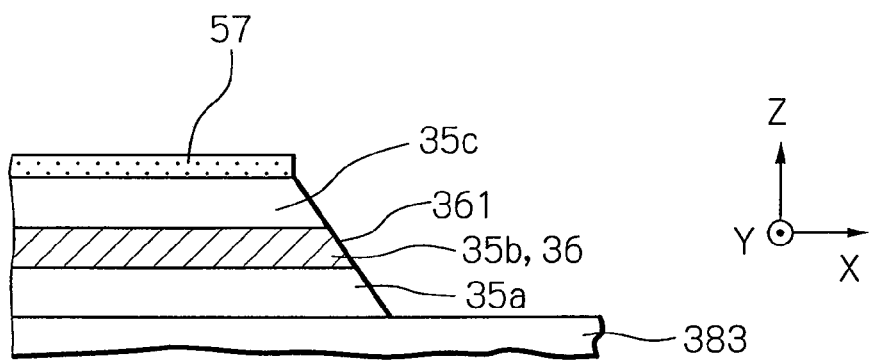
Figure 7H:
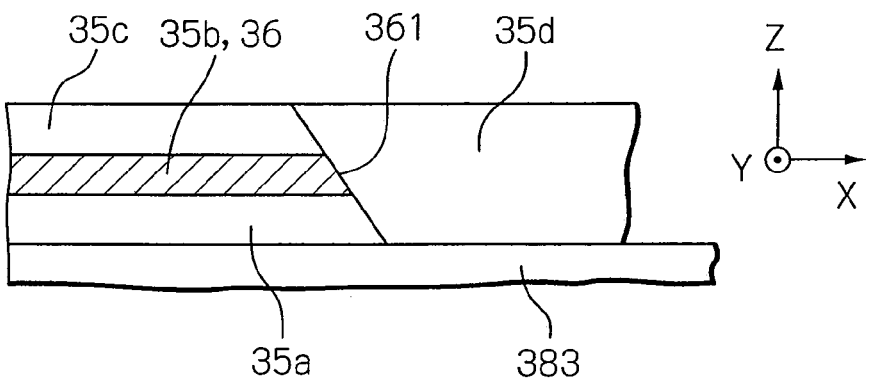
Figure 7I:
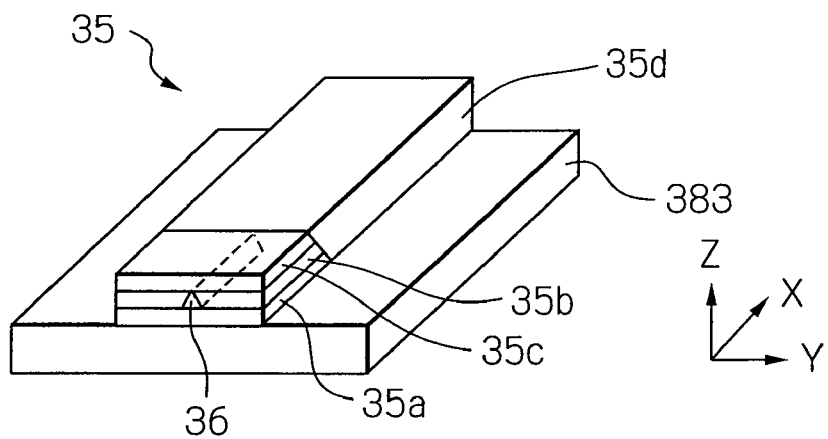

Further, as shown in FIG. 7f, a hard mask material such as Ta is deposited on the dielectric film 35c, and a hard mask 57 is formed by using a resist 58. Then, etching is performed by using a reactive ion etching (RIE) method, and the inclined surfaces of the dielectric film 35a, the metal layer 36, the dielectric film 35b and the dielectric film 35c are formed as shown in FIG. 7g. The inclined surfaces include the inclined end surface 361 of the metal layer 36. On this occasion, the inclination angle $\theta_{PA}$ of the inclined surface can be set at a desired value by selecting the material of each of the layers and the RIE conditions. The inclined surfaces can be formed by using an ion milling method that causes ions to be obliquely incident, instead of the RIE method. Thereafter, as shown in FIG. 7h, a dielectric film 35d made of the same material as the dielectric film 35a is deposited so as to cover the inclined surfaces and is planarized. Further, by patterning the dielectric films 35a, 35b, 35c and 35d to have a predetermined width, a waveguide 35 is formed as shown in FIG. 7i.

Figure 7J:
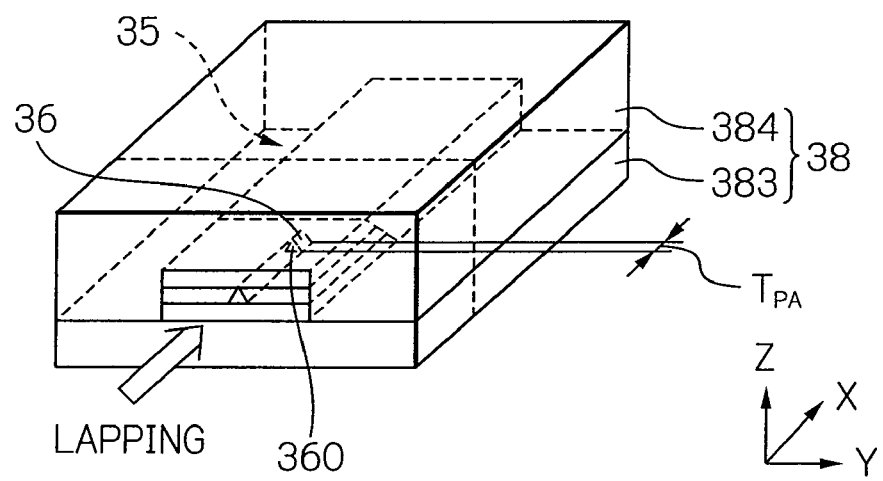

Further, thereafter, as shown in FIG. 7j, an insulating layer 384 made of the same material as the insulating layer 383 is formed so as to cover the waveguide 35. Thereby, an insulating layer 38 as a clad is completed. Thereafter, polishing as MR height processing is applied, and thereby, the plasmon antenna 36 having a predetermined thickness $T_{PA}$ is formed. Here, the end surface 360 of the plasmon antenna 36 becomes a polished flat surface.

Comparative Example 1 and Practical Examples 1 to 4

Hereinafter, the effect of the generation of near-field light in the plasmon antenna according to the present invention will be shown by using the results of the simulation experiments which were conducted as comparative example 1 and practical examples 1 to 4.

The simulation experiments of the generation of near-field light in the plasmon antenna were conducted by using a three-dimensional Finite-Difference Time-Domain method: FDTD method, which is an electromagnetic field analysis. The systems used in the simulation experiments were four, which respectively have inclination angle $\theta_{PA}=0°$ (comparative example 1), $\theta_{PA}=15°$ (practical example 1), $\theta_{PA}=30°$ (practical example 2), and $\theta_{PA}=45°$ (practical example 3), in the plasmon antenna (36) shown in FIG. 5. In each of the plasmon antennas, the shape of the end surface on the opposite side to the end surface receiving the laser light 48, where a near-field light was generated, was the equilateral triangle with each edge being 300, 200 or 100 nm. In the case of each edge of 300 nm, the height is about 260 nm. The incident laser light 48 had a wavelength $\lambda_L$ of 650 nm, and was a plane wave having a TM polarization mode with the vibration direction of the electric field component being in Z-axis direction. The mesh size in the simulation was uniform and was 2 nm. Further, the intensity value of the generated near-field light was a value in the cubic of 2 nm×2 nm×2 nm. Further, the constituent material of the plasmon antenna 36 was Au, the real part $n_R$ of the refractive index was 0.206, and the imaginary part $n_I$ was 3.517.

Figure 10A:
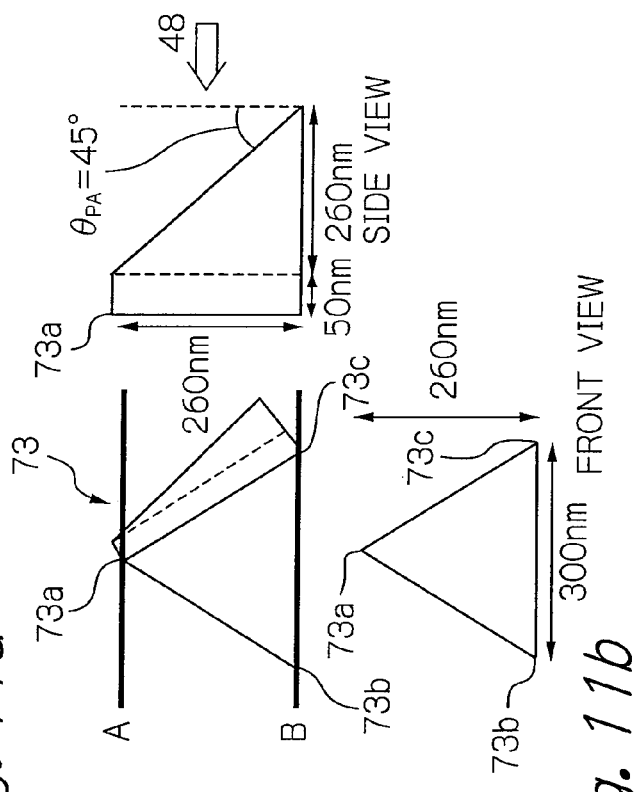
FIGS. 10a and 10b show a schematic view illustrating a plasmon antenna used for practical example 2 (one edge: 300 nm), and a graph illustrating the result of the simulation experiment in example 2, respectively.
Figure 10B:
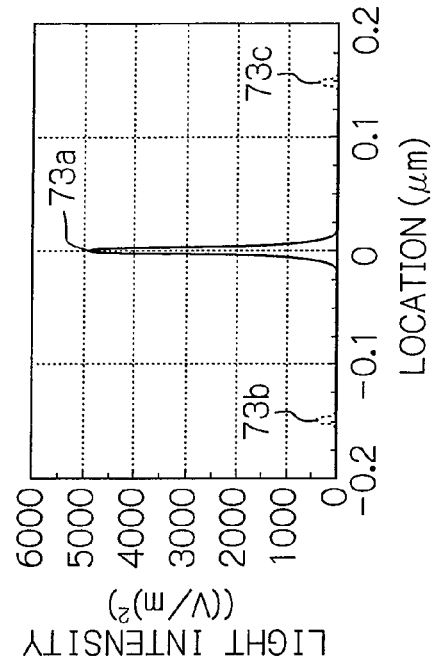
Figure 11A:
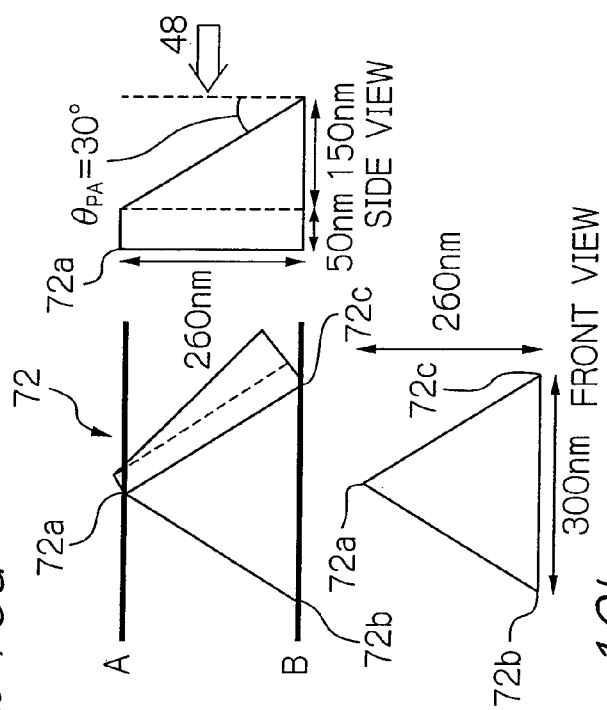
FIGS. 11a and 11b show a schematic view illustrating a plasmon antenna used for practical example 3 (one edge: 300 nm), and a graph illustrating the result of the simulation experiment in practical example 3, respectively.
Figure 11B:
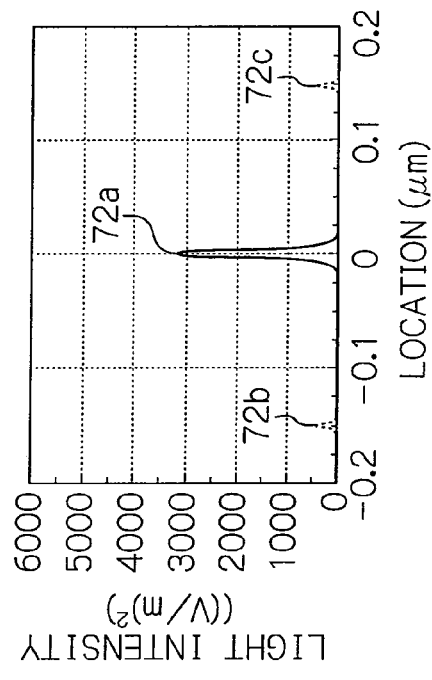

FIGS. 8a and 8b show a schematic view illustrating a plasmon antenna 70 used for comparative example 1 (one edge: 300 nm), and a graph illustrating the result of the simulation experiment in comparative example 1, respectively. Further, FIGS. 9a and 9b show a schematic view illustrating a plasmon antenna 71 used for practical example 1, and a graph illustrating the result of the simulation experiment in example 1 (one edge: 300 nm), respectively. Further, FIGS. 10a and 10b show a schematic view illustrating a plasmon antenna 72 used for practical example 2 (one edge: 300 nm), and a graph illustrating the result of the simulation experiment in example 2, respectively. Further, FIGS. 11a and 11b show a schematic view illustrating a plasmon antenna 73 used for practical example 3 (one edge: 300 nm), and a graph illustrating the result of the simulation experiment in practical example 3, respectively.

In each of the graphs in FIGS. 8b, 9b, 10b and 11b, the solid lines indicate the near-field light intensities in the case of scanning lines A in FIGS. 8a, 9a, 10a and 11a, respectively. Further, the dotted lines indicate the near-field light intensities in the case of scanning lines B in FIGS. 8a, 9a, 10a and 11a, respectively.

According to FIG. 8b, in the plasmon antenna 70 with the inclination angle $\theta_{PA}=0°$ which has a shape of an equilateral triangle of each edge of 300 nm in comparative example 1, the near-field lights are generated in only the locations near the three vertexes 70a, 70b and 70c. Among them, the near-field light intensity is the highest in the vicinity of the vertex 70a. The intensity ratio is such that the vertex 70a:the vertex 70b:the vertex 70c=2.1:1:1. Thus it is understood that in the vertex portions other than the vertex 70a, the considerable near-field lights are generated.

In contrast with this, according to FIG. 9b, in the plasmon antenna 71 with the inclination angle $\theta_{PA}=15°$, which has a shape of an equilateral triangle with each edge of 300 nm in practical example 1, the near-field lights were also generated in only the locations near the three vertexes 71a, 71b and 71c, and the near-filed light intensity is the highest in the vicinity of the vertex 71a. The intensity ratio is such that the vertex 71a:the vertex 71b:the vertex 71c=7.9:1:1. Specifically, the intensity ratio for the vertex 71a becomes higher than the case of 5:1:1 which is the reference for making it possible to form only the desired record bit in the actual heat-assisted magnetic recording.

Further, according to FIGS. 10b and 11b, in the plasmon antennas 72 and 73 with the inclination angles $\theta_{PA}=30°$ and 45° in practical examples 2 and 3 (each edge: 300 nm), the intensity ratios are 9.3:1:1 and 13.8:1:1, respectively, and the intensity ratios for the vertexes 72a and 73a are also higher than the case of 5:1:1 which is the reference for making it possible to form only the desired record bit.

Here, Table 1 shows the result of determining the intensity ratios $IR_{MAX}$ for the vertexes where the near-field light intensity becomes the highest (70a, 71a, 72a, 73a and the like described above) with respect to the intensities at the other vertexes, in the plasmon antennas which have shapes of equilateral triangles with one edges of 300, 200 and 100 nm and have various inclination angles $\theta_{PA}$.

TABLE 1

| Inclination angle $\theta_{PA}$ (°) | Length of one edge of triangle | | |
|---|---|---|---|
| | 300 nm | 200 nm | 100 nm |
| 0 | 2.1 | 2.5 | 2.4 |
| 15 | 7.9 | 8.3 | 9.5 |
| 30 | 9.3 | 11.3 | 13.8 |
| 45 | 13.8 | 12.5 | 11.5 |
| 60 | 6.2 | 5.8 | 5.1 |
| 75 | 2.4 | 2.1 | 1.8 |

Figure 12:
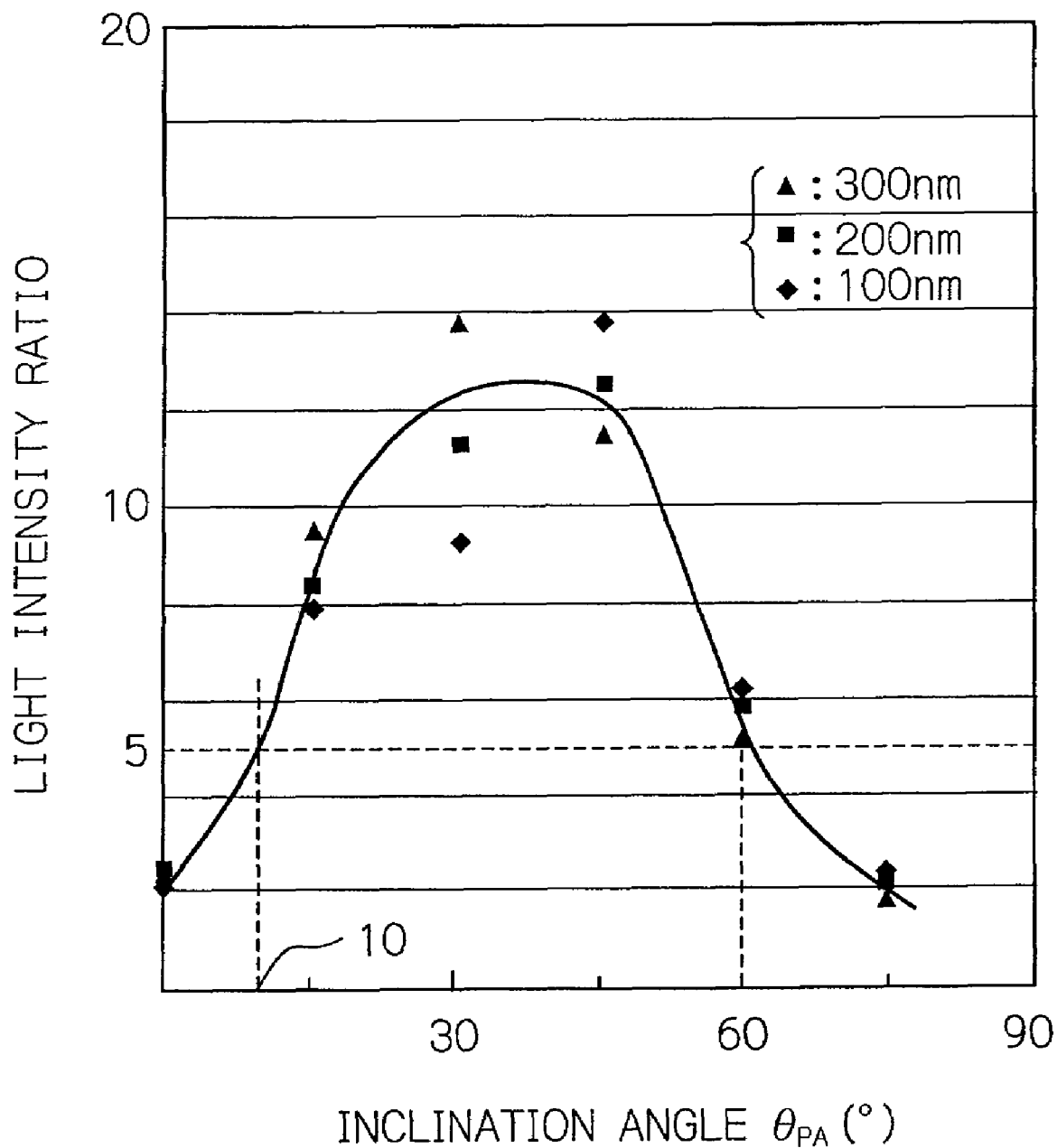
FIG. 12 shows a graph of the data shown in Table 1 illustrating the intensity ratios $IR_{MAX}$ in the plasmon antennas having various inclination angles $\theta_{PA}$ and edge lengths.

Further, FIG. 12 shows a graph of the data shown in Table 1 illustrating the intensity ratios $IR_{MAX}$ in the plasmon antennas having various inclination angles $\theta_{PA}$ and edge lengths.

According to FIG. 12 and Table 1, in each case of the triangles with the lengths of one edges being 300, 200 and 100 nm, the intensity ratio $IR_{MAX}$ which is the desired value of 5 or more is realized if the inclination angle $\theta_{PA}$ is within the range from 10° to 60° inclusive. Accordingly, it is understood that the inclination angle $\theta_{PA}$ is preferably from 10° to 60°.

(Comparison with Nano-Beak Type)

FIGS. 13a to 13c show schematic views illustrating the conventional nano-beak type plasmon antenna and the plasmon antenna of practical example 3, and a graph comparing the near-field light intensities in both the plasmon antennas.

According to FIG. 13a, a plasmon antenna 74 is of a nano-beak type, the end surface receiving the laser light 48 has a shape of an equilateral triangle with each edge of 300 nm, and an end surface 740 on the opposite side to the end surface is inclined by 45° from a plane perpendicular to the traveling direction of the incident laser light 48. The entire plasmon antenna 74 becomes thicker toward a vertex 74a, the vertex 74a is disposed at the nearest location to a magnetic recording medium, and the near-field light generated from the vertex 74a is used. Here, the constituent material of the plasmon antenna 74 was Au. In contrast with this, according to FIG. 13b, the plasmon antenna 73 is the same as that shown in FIG. 11a, and has the light-receiving end surface with the inclination angle $\theta_{PA}=45°$. Here, the constituent material of the plasmon antenna 73 was also Au.

When the near-field light intensities in the vertexes 73a and 74a of the plasmon antennas 73 and 74 were compared, the near-field light intensity of the plasmon antenna 73 of the present invention was 4890 (V/m)$^2$, and was the value of about 1.2 times as large as the intensity of 4100 (V/m)$^2$ for the plasmon antenna 74, as shown in FIG. 13c. Thus, it is understood that the plasmon antenna of the present invention can realize a higher near-field light intensity as compared to the nano-beak type of plasmon antenna with about the same size.

The nano-beak type plasmon antenna further has the following problem in formation. More specifically, the formation of the beak portion (vertex 74a) which generates a near-field light is not performed in the thin-film wafer process, but has to be performed during ABS process after cutting the row bars, in the actual head manufacturing; thus a large number of steps are required. Further, when milling is intended to be performed with the ion beam being obliquely fixed in the forming process, there arises the possibility of cutting the magnetic pole. Further, after formation of the beak portion (vertex 74a), an engraving is easily formed on its ABS. Such an engraving can cause the flying of the head to be unstable. The countermeasure of filling the engraving with an insulating material is conceivable, but this requires lapping to be performed after deposition for the filling. On this occasion, the tolerance of lapping is generally at least ±10 nm. Thus, it is very difficult to finish polishing with high accuracy at the location of the vertex 74a in the beak portion, and the beak portion cannot be formed with high process yield.

In contrast with this, in the plasmon antenna according to the present invention, as shown in, for example, FIGS. 7a to 7j, the inclination of the end surface which receives the laser light can be formed in the thin-film wafer process of the actual head manufacturing. Accordingly, the plasmon antenna according to the present invention can be produced easily with high accuracy as compared to the nano-beak type.

(Comparison in the Plasmon Antennas of Different Constituent Materials)

FIGS. 14a and 14b show graphs illustrating the near-field light intensities in the plasmon antennas according to the present invention formed of different constituent materials.

In each of the plasmon antennas in FIGS. 14a and 14b, the end surface has a shape of an equilateral triangle with each edge of 300 nm with the inclination angle $\theta_{PA}=30°$. Here, the plasmon antenna of FIG. 14a was formed of Au, whereas the plasmon antenna of FIG. 14b was formed of AuCu. The real part $n_R$ of the refractive index of Au was 0.206, and the imaginary part $n_I$ was 3.517, which were the same as the values used in the above described simulation experiments. The real part $n_R$ of the refractive index of AuCu was 0.266, and the imaginary part $n_I$ was 3.498. When the results of the simulation experiments of FIGS. 14a and 14b are compared, it is understood that the plasmon antennas of the present invention show substantially similar intensity distributions when the constituent materials were Au and AuCu, and the intensity ratio $IR_{MAX}$ that is a desired value of 5 or more is realized in each case.

As described above, it is understood that according to the present invention, the heat-assisted magnetic recording head generating the near-field light having a sufficient intensity in only the desired location and capable of forming only the desired record bit is realized. This allows favorable heat-assisted magnetic recording to be realized, and can contribute to achievement of a recording density exceeding 1 Tbits/in$^2$, for example.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A heat-assisted magnetic recording head comprising in an element-integration surface of a substrate: a write head element for writing data to a magnetic recording medium; a plasmon antenna; and a waveguide, an end surface on a side where a near-field light is generated of said plasmon antenna, being flat and in plane with a flat opposed-to-medium surface of the head and having a shape with at least three vertexes or rounded corners, an end surface of said plasmon antenna which is opposite to the flat end surface, being inclined with respect to the flat end surface in such a way as to become closer to the flat end surface toward one of said at least three vertexes or rounded corners, and said waveguide being configured to propagate a light having a propagation direction substantially perpendicular to said flat end surface in plane with the flat opposed-to-medium surface and to obliquely enter the light into said plasmon antenna from said inclined end surface.

2. The heat-assisted magnetic recording head as claimed in claim 1, wherein an inclination angle of said end surface receiving said light with respect to the flat end surface is in a range from 10 degrees to 60 degrees.

3. The heat-assisted magnetic recording head as claimed in claim 1, wherein said plasmon antenna is formed of one element selected from a group of Au, Ag, Al, Cu, Pd, Pt, Rh and Ir, or of an alloy made of at least two elements selected from the group.

4. The heat-assisted magnetic recording head as claimed in claim 1, wherein the flat end surface has a shape of an isosceles triangle.

5. The heat-assisted magnetic recording head as claimed in claim 1, wherein a light source is provided on a side opposite to the opposed-to-medium surface of the head, and said waveguide includes an end surface that receives light from said light source on a side opposite to the opposed-to-medium surface.

6. A head gimbal assembly comprising: a suspension; and a heat-assisted magnetic recording head as claimed in claim 1 fixed on said suspension.

7. A magnetic recording apparatus comprising:

at least one head gimbal assembly comprising a suspension and a heat-assisted magnetic recording head fixed on said suspension; and at least one magnetic recording medium, said heat-assisted magnetic recording head comprising in an element-integration surface of a substrate: a write head element for writing data to the magnetic recording medium; a plasmon antenna; and a waveguide, an end surface on a side where a near-field light is generated of said plasmon antenna, being flat and in plane with a flat opposed-to-medium surface of the head and having a shape with at least three vertexes or rounded corners, an end surface of said plasmon antenna which is opposite to the flat end surface, being inclined with respect to the flat end surface in such a way as to become closer to the flat end surface toward one of said at least three vertexes or rounded corners, said waveguide being configured to propagate a light having a propagation direction substantially perpendicular to said flat end surface in plane with the flat opposed-to-medium surface and to obliquely enter the light into said plasmon antenna from said inclined end surface, and said magnetic recording apparatus further comprising a recording and light-emission control circuit for controlling a light emission operation for the light propagating through said waveguide, and for controlling a write operation performed by said heat-assisted magnetic recording head to said at least one magnetic recording medium.

8. The magnetic recording apparatus as claimed in claim 7, wherein an inclination angle of said end surface receiving said light with respect to the flat end surface is in a range from 10 degrees to 60 degrees.

9. The magnetic recording apparatus as claimed in claim 7, wherein said plasmon antenna is formed of one element selected from a group of Au, Ag, Al, Cu, Pd, Pt, Rh and Ir, or of an alloy made of at least two elements selected from the group.

10. The magnetic recording apparatus as claimed in claim 7, wherein the flat end surface has a shape of an isosceles triangle.

11. The magnetic recording apparatus as claimed in claim 7, wherein a light source is provided on a side opposite to the opposed-to-medium surface of the head, and said waveguide includes an end surface that receives light from said light source on a side opposite to the opposed-to-medium surface.

* * * * *